United States Patent
Hibayashi et al.

(10) Patent No.: US 9,164,311 B2
(45) Date of Patent: Oct. 20, 2015

(54) COLOR FILTER SUBSTRATE FOR LIQUID CRYSTAL DISPLAY DEVICE AND LIQUID CRYSTAL DISPLAY DEVICE

(71) Applicant: TOPPAN PRINTING CO., LTD., Tokyo (JP)

(72) Inventors: Yasuhiro Hibayashi, Tokyo (JP); Kenzo Fukuyoshi, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 118 days.

(21) Appl. No.: 13/752,703

(22) Filed: Jan. 29, 2013

(65) Prior Publication Data

US 2013/0135547 A1    May 30, 2013

Related U.S. Application Data

(63) Continuation of application No. PCT/JP2011/066460, filed on Jul. 20, 2011.

(30) Foreign Application Priority Data

Jul. 29, 2010    (JP) .................................. 2010-171034

(51) Int. Cl.
*G02F 1/1335* (2006.01)
*G02B 5/20* (2006.01)
*G02F 1/133* (2006.01)
*G02F 1/1337* (2006.01)
*G02F 1/1343* (2006.01)

(52) U.S. Cl.
CPC ............ *G02F 1/133514* (2013.01); *G02B 5/20* (2013.01); *G02B 5/201* (2013.01); *G02F 1/13306* (2013.01); *G02F 1/133707* (2013.01); *G02F 2001/13373* (2013.01); *G02F 2001/134381* (2013.01); *G02F 2201/123* (2013.01); *G02F 2201/124* (2013.01)

(58) Field of Classification Search
CPC .................................................. G02F 1/133514
See application file for complete search history.

(56) References Cited

U.S. PATENT DOCUMENTS

| | | | |
|---|---|---|---|
| 2001/0043304 A1* | 11/2001 | Matsumoto | 349/141 |
| 2003/0086043 A1* | 5/2003 | Seo et al. | 349/129 |
| 2007/0216842 A1* | 9/2007 | Kawasaki et al. | 349/141 |
| 2010/0177256 A1* | 7/2010 | Park et al. | 349/42 |

(Continued)

FOREIGN PATENT DOCUMENTS

| | | |
|---|---|---|
| JP | 5-26161 | 2/1993 |
| JP | 7-13164 | 1/1995 |

(Continued)

OTHER PUBLICATIONS

International Preliminary Report on Patentability mailed Feb. 14, 2013 for corresponding International Application No. PCT/JP2011/066460.

(Continued)

*Primary Examiner* — Timothy L Rude

(57) ABSTRACT

A color filter substrate for a liquid crystal display device, includes a transparent substrate, a black matrix formed on the transparent substrate and having an opening for division into a plurality of pixels, a transparent conducting film, and a color layer formed on the pixel, wherein a linear projection is formed in a center of the pixel and a recess is formed above the black matrix.

6 Claims, 10 Drawing Sheets

(56) References Cited

U.S. PATENT DOCUMENTS

| | | | |
|---|---|---|---|
| 2012/0013594 A1* | 1/2012 | Ishihara et al. | 345/211 |
| 2012/0169981 A1* | 7/2012 | Murata et al. | 349/138 |

FOREIGN PATENT DOCUMENTS

| | | |
|---|---|---|
| JP | 2859093 | 12/1998 |
| JP | 2947350 | 7/1999 |
| JP | 2000-305100 | 11/2000 |
| JP | 2005-316027 | 11/2005 |
| JP | 2005-352451 | 12/2005 |
| JP | 2008-51856 | 3/2008 |
| JP | 2008-170523 | 7/2008 |
| JP | 2009-53482 | 3/2009 |
| JP | 2010-9064 | 1/2010 |
| JP | 4459338 | 2/2010 |
| JP | 4460849 | 2/2010 |
| WO | WO 2009/069362 A1 | 6/2009 |

OTHER PUBLICATIONS

International Search Report of Corresponding PCT Application PCT/JP2011/066460 mailed Sep. 6, 2011.

* cited by examiner

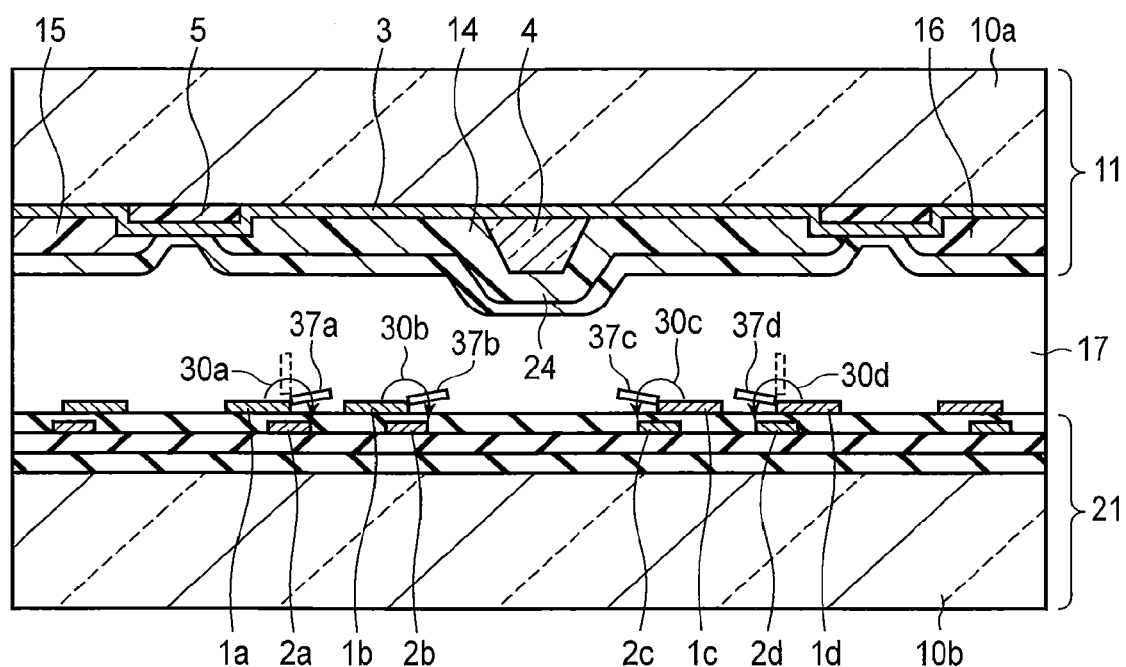
F I G. 7

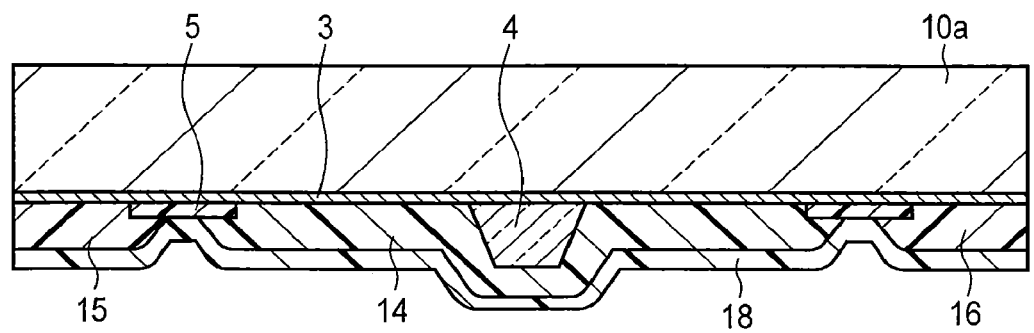
F I G. 10
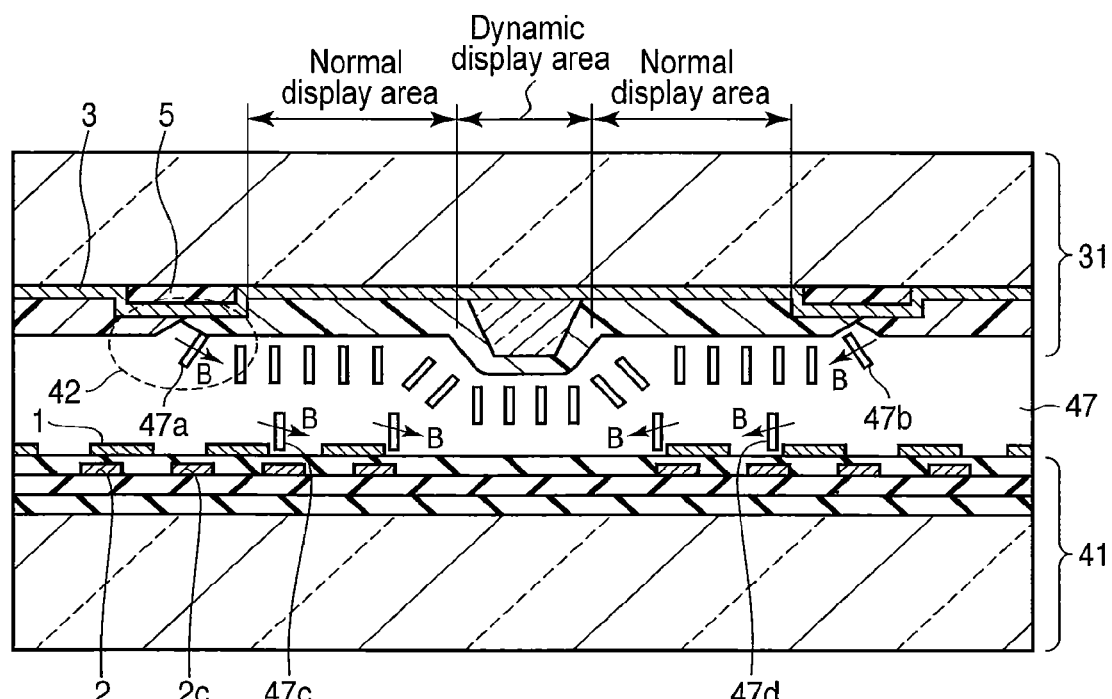
F I G. 11

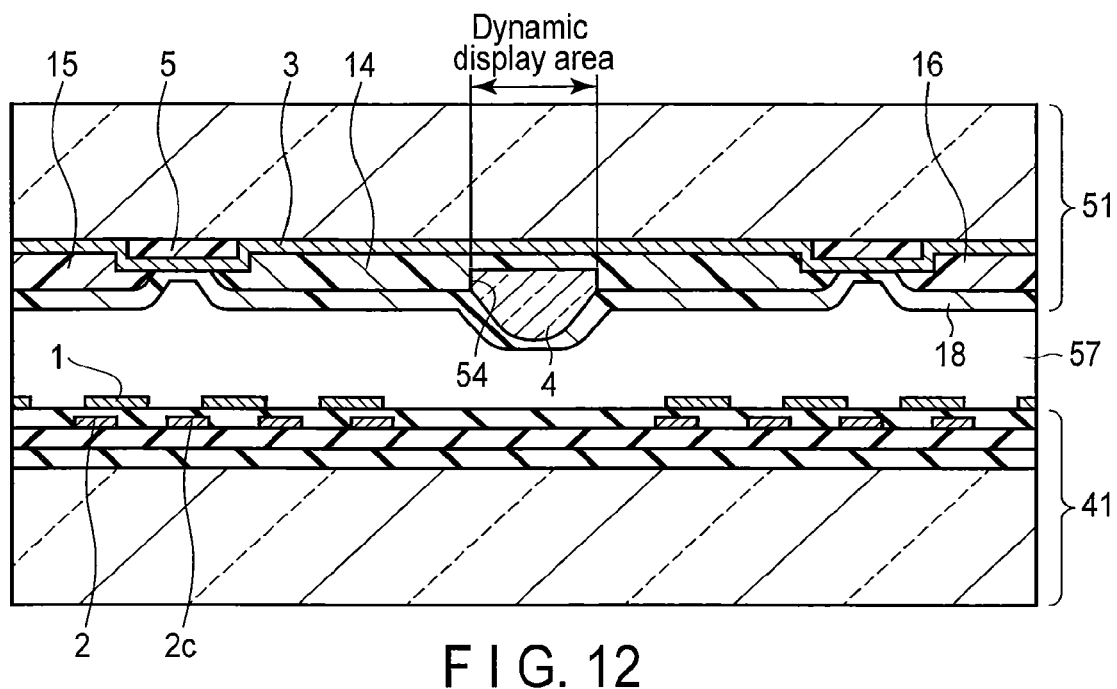
F I G. 12
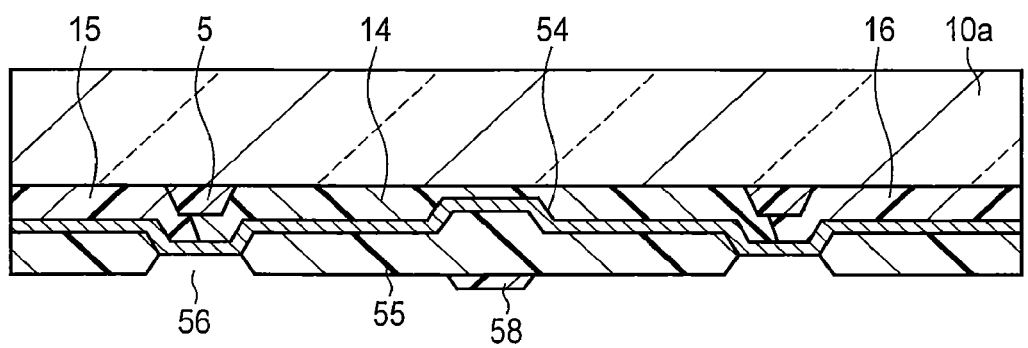
F I G. 13

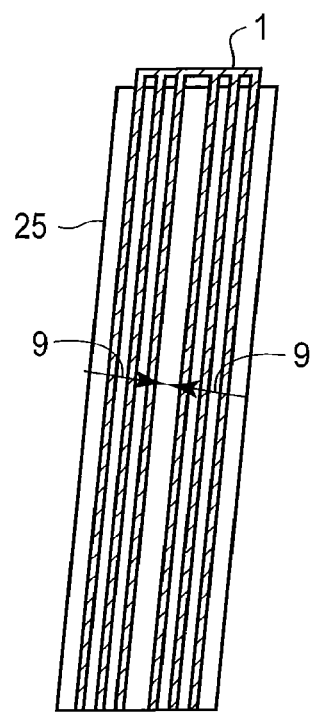
F I G. 17
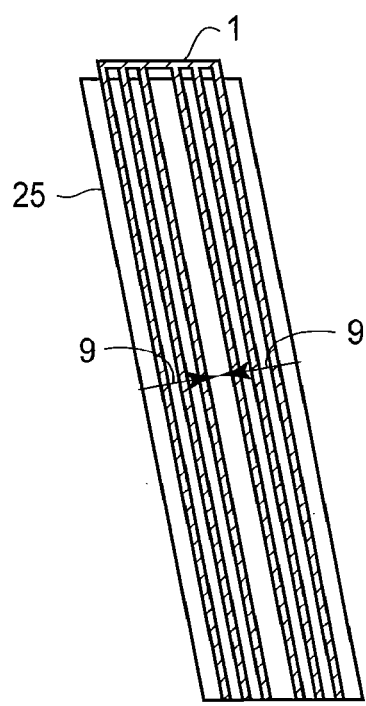
F I G. 18

COLOR FILTER SUBSTRATE FOR LIQUID CRYSTAL DISPLAY DEVICE AND LIQUID CRYSTAL DISPLAY DEVICE

CROSS REFERENCE TO RELATED APPLICATIONS

This application is a Continuation application of PCT Application No. PCT/JP2011/066460, filed Jul. 20, 2011 and based upon and claiming the benefit of priority from prior Japanese Patent Application No. 2010-171034, filed Jul. 29, 2010, the entire contents of all of which are incorporated herein by reference.

BACKGROUND OF THE INVENTION

1. Field of the Invention

The present invention relates to a color filter substrate for a liquid crystal display device and a liquid crystal display device including the color filter substrate. In particular, the present invention relates to a color filter substrate optimized for driving liquid crystals by an oblique electric field generated by applying a voltage between a transparent conducting film disposed on a color filter substrate and first and second electrodes provided on an array substrate side and a liquid crystal display device including the color filter substrate.

2. Description of the Related Art

In recent years, still higher quality, lower prices, and lower power consumption of slim display devices such as liquid crystal displays are demanded. Regarding color filters for liquid crystal display devices, requests fitting to higher quality display such as adequate color purity, high contrast, and flatness are submitted.

The liquid crystal alignment method such as VA (Vertically Alignment), HAN (Hybrid-aligned Nematic), TN (Twisted Nematic), OCB (Optically Compensated Bend), and CPA (Continuous Pinwheel Alignment) and the liquid crystal drive method have been proposed and displays with a wide angle of visibility/fast response have thereby been commercialized.

In a liquid crystal display device of the VA system that can more easily be adapted to a wide angle of visibility and fast response by the liquid crystals aligned in parallel with the substrate surface formed of glass or the like or the HAN system that is effective for a wide angle of visibility, still higher levels of requests are made regarding flatness of color filters (uniformity of thickness and reduction of irregularities on the color filter surface) and electric properties such as the dielectric constant. For such a high-quality liquid crystal display, the main subject is a technology to slim the thickness of liquid crystal cells (thickness of the liquid crystal layer) to reduce coloring in oblique direction visual recognition. In the VA system, various improved modes such as MVA (Multi-Domain Vertically Alignment), PVA (Patterned Vertically Alignment), VAECB (Vertically Alignment Electrically Controlled Birefringence), VAHAN (Vertical Alignment Hybrid-aligned Nematic), and VATN (Vertically Alignment Twisted Nematic) are under development. In a liquid crystal display device of a longitudinal electric field system like the VA system in which a drive voltage is applied in the thickness direction of liquid crystal, the main subject includes a faster liquid crystal response, technology of a wider angle of visibility, and higher transmittance. The MVA technology is a technology to secure a wide angle of visibility by providing a plurality of liquid crystal alignment regulating structures called ribs or slits to form liquid crystal domains between these ribs and also to form domains in a plurality of alignment directions to solve the problem of unstable vertically aligned liquid crystals when a liquid crystal driving voltage is applied (the direction of inclination in which liquid crystals initially aligned vertically with respect to the substrate surface is less likely to be determined when a voltage is applied). Japanese Patent No. 2947350 discloses a technology to form a liquid crystal domain by using first and second or alignment regulating structures (ribs).

If the liquid crystal has negative dielectric constant anisotropy, more specifically, a liquid crystal positioned between two ribs made of resin formed on a color filter or the like attempts, for example, to incline in a direction perpendicular to the ribs to be aligned in parallel with the substrate surface in a plane view when a drive voltage is applied. However, the inclination direction in which the liquid crystals in the center between two ribs is not uniquely determined regardless of the application of voltage and may take a spray alignment or bend alignment. Such an alignment disorder of liquid crystal leads to a rough liquid crystal display or display unevenness. Also in the MVA system, it is difficult to finely control the amount of inclining liquid crystals by a drive voltage including the above problem and also the halftone display has weaknesses.

To solve such problems, Japanese Patent No. 2859093 and Japanese Patent No. 4459338 disclose a technology that uses a transparent conducting film (a transparent electrode, display electrode, or third electrode) on the side of a filter substrate and first and second electrodes on the side of an array substrate to control a vertically aligned liquid crystal by an oblique electric field generated by a voltage being applied to these electrodes. Japanese Patent No. 2859093 uses a liquid crystal of negative dielectric constant anisotropy and Japanese Patent No. 4459338 describes a liquid crystal of positive dielectric constant anisotropy.

As shown in Japanese Patent No. 2859093 and Japanese Patent No. 4459338, the method of using the first, second, and third electrodes to control the liquid crystal alignment by an oblique electric field is very effective. The inclination direction of the liquid crystals can be set by the oblique electric field. Moreover, the oblique electric field makes the control of the amount of the liquid crystal inclination easier, which has an important effect on the halftone display.

However, even such a technology has insufficient measures against disclination of liquid crystal. The disclination is a problem arising in a pixel (the pixel is the minimum unit of liquid crystal display and is synonymous with the pixel described in the present invention) in which regions of different optical transmittances arise due to an unintended alignment disorder of liquid crystal or non-alignment.

According to Japanese Patent No. 2859093, an alignment control window without transparent conducting film is provided in the pixel center of the counter electrode (third electrode) to fix the disclination in the pixel center. However, no improvement proposal of the disclination in the pixel periphery is disclosed. Though the disclination in the pixel center can be fixed, no proposal for minimizing the disclination is shown. Further, no technology to improve responsiveness of liquid crystal is described.

Japanese Patent No. 4459338 is preferable because a dielectric layer is stacked on the transparent conducting film (transparent electrode) and the effect of the oblique electric field is enhanced for the stacked dielectric layer. However, as shown in FIG. 7 of Japanese Patent No. 2859093, a vertically aligned liquid crystal remains in the pixel center and pixel periphery, causing a problem of lower transmittance or aperture ratio. If a liquid crystal of positive dielectric constant anisotropy is used (Japanese Patent No. 2859093 does not disclose any description/embodiment of a liquid crystal of negative dielectric constant anisotropy), it is difficult to improve transmittance due to the disclination in the pixel center. Thus, the technology is hard to adopt for a transflective liquid crystal display device.

The basic configuration of a liquid crystal display device of the VA system or TN system is normally a configuration in which a liquid crystal is sandwiched between a color filter substrate including a common electrode and an array substrate including a plurality of pixel electrodes (for example, transparent electrodes electrically connected to a TFT element and formed in a comb-like pattern shape) driving the liquid crystal. In this configuration, the liquid crystal is driven by applying a drive voltage between the common electrode on the color filter and the pixel electrodes formed on the side of the array substrate. A thin film of conductive metal-oxides such as ITO (Indium Tin Oxide), IZO (Indium Zinc Oxide), and IGZO (Indium Gallium Zinc Oxide) is used as the pixel electrode and the transparent conducting film as the common electrode on the color filter surface.

FIG. 2 of Jpn. Pat. Appln. Publication No. 5-26161 discloses a technology to disclose the configuration of a color filter in which a blue pixel, green pixel, and red pixel are formed on a transparent conducting film. Also, a technology, though using a plurality of stripe electrodes and a liquid crystal of positive dielectric constant anisotropy, that forms a color filter on a transparent electrode (transparent conducting film) is described in Japanese Patent No. 2859093 (for example, FIGS. 7 and 9 of the patent literature).

A technology to improve luminance or lightness or extend the chromaticity range to obtain a higher quality and more dynamic display is disclosed by Jpn. Pat. Appln. KOKAI Publication No. 2010-9064, Japanese Patent No. 4460849, and Jpn. Pat. Appln. KOKAI Publication No. 2005-352451. Also, a technology of 4-color display by adding a yellow pixel or white pixel, in addition to the blue pixel, green pixel, and red pixel is known.

However, it is necessary for these technologies to provide another pixel such as a yellow or white pixel and an active element (TFT) to drive the pixel and still one color layer to form a color filter are needed, leading to higher costs due to increased processes. In addition, it is necessary to inhibit or turn off the display of white or yellow pixels in a gradation display range in which the display of yellow or white that is bright in intensity is not needed, causing a problem of being unlikely to lead to an effective increase in luminance. Further, in the reflective type display, a problem that the display takes on a yellow tinge is posed (to suppress the yellow tinge, for example, a special blue filter disclosed by Jpn. Pat. Appln. KOKAI Publication No. 2005-352451 is needed).

BRIEF SUMMARY OF THE INVENTION

Technical Problem

An object of the present invention is to provide a color filter substrate for a liquid crystal display device achieving improvements of both of the gradation display and responsiveness at the same time and a liquid crystal display device including the color filter substrate.

Solution to Problem

In order to solve the above problem, according to a first aspect of the present invention, a color filter substrate for a liquid crystal display device, comprising: a transparent substrate; a black matrix formed on the transparent substrate and having an opening for division into a plurality of pixels; a transparent conducting film; and a color layer formed on the pixel, wherein a linear projection is formed in a center of the pixel and a recess is formed above the black matrix is provided.

According to a second aspect of the present invention, a liquid crystal display device including the color filter substrate for a liquid crystal display device according to the above first aspect of the present invention is provided.

According to a third aspect of the present invention, a liquid crystal display device that includes a black matrix having a plurality of pixels, a transparent conducting film, and a linear resin layer on a transparent substrate and includes a color filter substrate including color pixels formed of a plurality of color layers respectively on the pixels, an array substrate on which drive elements for liquid crystals are disposed in a matrix arrangement, and a liquid crystal layer interposed between the color filter substrate and the array substrate, wherein the linear resin layer is disposed in a center of the pixel on the transparent conducting film in a plane view, a linear projection projecting to the side of the liquid crystal is formed by laminating the linear resin layer and the color layer, the array substrate includes a comb-like first electrode and a comb-like second electrode, each of which formed of a transparent conductive oxide in a visible region, the second electrode is disposed below the first electrode via an insulating layer, and the second electrode protrudes from an end of the first electrode in a direction toward the linear resin layer or in a direction toward the center of the pixel in the plane view.

BRIEF DESCRIPTION OF THE SEVERAL VIEWS OF THE DRAWING

FIG. 7 is a diagram showing an operation of liquid crystal molecules immediately after the voltage to drive the liquid crystal of the vertically aligned liquid crystal display device shown in FIG. 6 being applied and also electric lines of force.

FIG. 10 is a partial sectional view showing a color filter substrate according to Example 2.

FIG. 11 is a partial sectional view showing a liquid crystal display device according to Example 4.

FIG. 12 is a partial sectional view showing a liquid crystal display device according to Example 5.

FIG. 13 is a partial sectional view showing a liquid crystal display device according to Example 6.

FIG. 17 is a diagram showing a pattern shape in the plane view of the first electrode when a pixel opening is parallelogrammic.

FIG. 18 is a diagram showing a pattern shape in the plane view of the first electrode when the pixel opening is parallelogrammic.

DETAILED DESCRIPTION OF THE INVENTION

Figure 1:
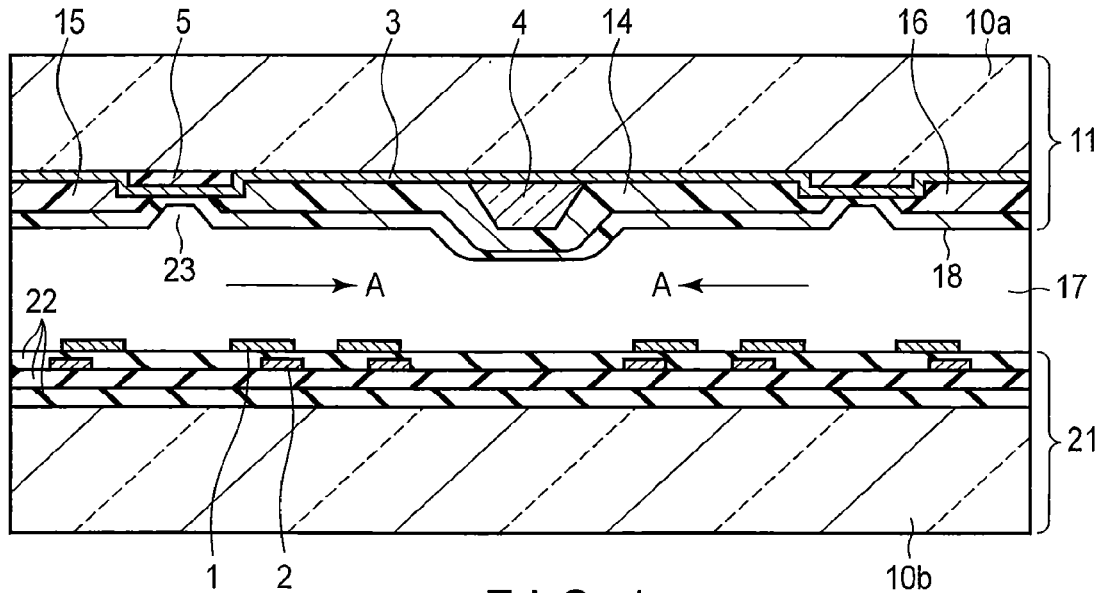
FIG. 1 is a schematic sectional view of a liquid crystal display device according to an embodiment of the present invention.

The embodiments of the present invention will be described later.

A color filter substrate for a liquid crystal display device according to the first aspect of the present invention includes a transparent substrate, a black matrix formed on the transparent substrate and having an opening for division into a plurality of pixels, a transparent conducting film, and a color layer formed on the pixel. A linear projection is formed in a center of the pixel and a recess is formed above the black matrix.

In a color filter substrate, a configuration in which a linear resin layer is formed in the center of the pixel, the linear projection is a laminated constitution of the linear resin layer and the color layer, and the recess is formed by a step between the adjacent color layers can be adopted.

In this case, the transparent conducting film may be formed on the black matrix or the black matrix may be formed on the transparent conducting film. The laminated constitution of the linear resin layer and the color layer may be laminated in an order of the linear resin layer and the color layer.

The laminated constitution of the linear resin layer and the color layer is laminated in the order of the color layer and the linear resin layer and the thickness of the color layer of the laminated constitution with the linear resin layer can be made thinner than the thickness on the pixel excluding the laminated constitution.

In such a case, a protective layer can further be laminated to cover the black matrix and the color layer.

A configuration in which a portion of the color layer corresponding to the linear projection has a thin thickness, a first resin layer is formed on the color layer excluding a portion above the black matrix, a second resin layer is formed in a portion of the first resin layer corresponding to the thin portion of the color layer, the linear projection is formed of the second resin layer, and the recess is formed of a portion above the black matrix where the first resin layer is not present can be adopted.

In this case, the transparent conducting film can be formed on the color layer.

In the above color filter substrate for a liquid crystal display device, the color layer can include three color layers formed of a red pixel, a green pixel, and a blue pixel formed on the respective pixel.

A liquid crystal display device according to the second aspect of the present invention includes the above color filter substrate for a liquid crystal display device according to the first aspect of the present invention.

Such a liquid crystal display device is a liquid crystal display device includes the color filter substrate for a liquid crystal display device, an array substrate on which driving elements for liquid crystals are disposed in a matrix arrangement, and a liquid crystal layer interposed between the color filter substrate and the array substrate, and the array substrate can be assumed to include first and second electrodes to which different potentials are applied to drive the liquid crystals.

When a drive voltage is applied between the first electrode, and the second electrode and third electrode, molecules of the liquid crystal in a pixel region of the liquid crystal display device can be caused to perform a inclining operation in opposite directions symmetrically with respect to a straight line dividing the pixel region into two parts.

The operation of the liquid crystal in the pixel when the voltage to drive the liquid crystal is applied can be made to be divided into four domains symmetrically with respect to a point in a plane view.

A configuration in which the first electrode has a comb-like pattern connected to an active element driving the liquid crystal and the second electrode has a comb-like pattern disposed below the first electrode via an insulating layer and also the second electrode protrudes from an end of the first electrode in a direction toward the linear resin layer or in a direction toward the pixel center in a plane view can be adopted.

The first electrode and the second electrode can be formed of a conductive metal-oxides that is transparent in the visible range.

A liquid crystal display device according to the third aspect of the present invention includes a black matrix having a plurality of pixels, a transparent conducting film, and a linear resin layer on a transparent substrate and includes a color filter substrate including color pixels formed of a plurality of color layers on the pixels, an array substrate on which drive elements for liquid crystals are disposed in a matrix arrangement, and a liquid crystal layer interposed between the color filter substrate and the array substrate. The linear resin layer is disposed in the pixel center on the transparent conducting film in a plane view, a linear projection projecting to the liquid crystal side is formed by laminating the linear resin layer and the color layer, the array substrate includes a comb-like first electrode and a comb-like second electrode, each of which formed of a transparent conductive oxide in the visible region, the second electrode is disposed below the first electrode via an insulating layer, and the second electrode protrudes from an end of the first electrode in a direction toward the linear resin layer or in a direction toward the pixel center in a plane view.

Such a liquid crystal display device can be configured in such a way that the first electrode is not disposed in a position opposite to the linear resin layer on the array substrate in a plane view.

Also in the above liquid crystal display device, a liquid crystal having negative dielectric constant anisotropy can be used as the liquid crystal.

According to the above aspects of the present invention, a color filter substrate for a liquid crystal display device achieving improvements of both of the gradation display and responsiveness at the same time and a liquid crystal display device including the color filter substrate are provided. Particularly, according to the aspects of the present invention, a color filter substrate for a liquid crystal display device capable of making a display full of liveliness by emphasizing particularly brightness without disturbing the color balance and increasing the number of TFT elements and a liquid crystal display device including the color filter substrate are provided. According to the aspects of the present invention, when applied to a reflective type liquid crystal display, a reflective type display with excellent color balance can be made without yellow tinge.

Further, according to the aspects of the present invention, a dynamic and bright display can be obtained without increasing pixels such as white pixels or yellow pixels and thus, a liquid crystal display device capable of making a brighter display than before is provided without dead pixels like white pixels in a normal gradation display and further without disclination that lowers the transmittance of liquid crystal.

Various embodiments of the present invention will be described later with reference to the drawings.

An embodiment of the present invention is mainly intended as a normally black-display liquid crystal display device using a liquid crystal whose initial alignment is vertically aligned or horizontally aligned and assumes a liquid crystal display device configured by opposing a color filter substrate and an array substrate on which liquid crystal driving elements such as TFT are formed while a liquid crystal layer being sandwiched therebetween. Therefore, the technology according to the present invention can be applied to a liquid crystal display device using a liquid crystal whose initial alignment is horizontal and which rises in the vertically direction when a voltage is applied. In addition, in the present embodiment, an oblique electric field generated in an electrode configuration in which the transparent conducting film as the third electrode is disposed on the color filter substrate with respect to the first electrode and the second electrode whose potential is different from that of the first electrode as pixel electrodes provided on the array substrate side is utilized.

The inventors found that a recess formed by a step created by overlapping adjacent color layers and a projection provided in the center that makes a pixel symmetric with respect to a line can be used for controlling the alignment of liquid crystal. The present invention proposes a new technology that adds the above finding and the configuration of a third electrode (transparent conducting film).

In the present embodiment, the projection is configured by a superimposed portion of a linear resin layer as a transparent resin and a thin color layer and light passing through the linear resin layer and the thin color layer of the projection is used to increase transmittance in the liquid crystal display. The main action of the projection is to enable a dynamic display in which light transmission is increased when a high drive voltage is applied to the liquid crystal by being utilized as a thick dielectric material. The projection has a role adding a voltage gradient to the liquid crystal layer. The projection as a laminated constitution of the linear resin layer and the thin color layer becomes a dynamic display area described later. A color layer of an approximately uniform thickness (about twice the thickness of the thin color layer) is disposed in a normal transmissive display area without projection formation in the pixel opening.

In contrast, the recess has, as will be described next, a somewhat different role from the projection in that a liquid crystal aligned obliquely in a shoulder portion of the recess is utilized for the liquid crystal to respond. It is better for the transparent conducting film as the third electrode positioned in the recess to have a thickness of the color layers laminated at the site and other organic resins that is as thin as possible so that the drive voltage can be transmitted to the liquid crystal layer more easily. The third electrode of the recess is desirably arranged in a position close to the liquid crystal layer.

The recess is provided to use the tilt of the liquid crystals in the shoulder portion for the inclination of the liquid crystals. The operation of liquid crystal will be described in detail in subsequent embodiments. The preferable depth of the recess is in the range of 0.5 µm to 2 µm. If the depth is less than 0.5 µm, the effect as a "trigger of the inclination of the liquid crystals" when a voltage is applied is insufficient and if the depth exceeds 2 µm, the flow of the liquid crystals during manufacturing of liquid crystal cells may be hindered. The shoulder portion of the projection can similarly be used when the tilt of liquid crystal is used for the inclination of liquid crystals.

The projection may have a round shape and the semilunar, trapezoidal, and triangular shapes can be illustrated as the sectional shape thereof. The angle of gradient with the substrate surface of the projection does not specifically have to be specified because the whole height of the projection described above only needs to exceed 0.5 µm. Though it is necessary to consider the aperture ratio (transmittance as a pixel), the angle of gradient may be a low angle like 2° or 3° and any shape excluding an inverse tapered shape (inverted trapezoidal shape with a larger upper side) is allowed. However, the angle of gradient is preferably in the range of effectively 30° to 80° to obtain an appropriate aperture ratio. The flow of liquid crystal when the liquid crystal is enclosed is hindered if the height from the normal transmission area surface of the height exceeds 2 µm and thus, the height thereof is preferably 2 µm or less.

When a liquid crystal of negative dielectric constant anisotropy is applied to the present invention, as will be described later, the liquid crystals on the surface of a color filter substrate for a liquid crystal display device according to the present invention performs an operation of inclining in the direction of the linear resin layer of the projection triggered by liquid crystal molecules near the shoulder portion of the recess. To incline the liquid crystals in symmetrical directions with the linear resin layer of the projection, respective differences in height of the bottom position of the recess, the position of the top surface of the color layers in the normal display area, and the position of the apex of the projection from the surface of the transparent substrate can be formed higher in this order. The top surface of the normal display area is either a protective layer by a transparent resin or a color layer without formation of a protective layer.

Technical terms in the present embodiment will briefly be described.

The black matrix is a light-shielding pattern disposed around a picture element as the minimum unit of display or on both sides of a picture element to enhance contrast of the liquid crystal display. The light-shielding layer is a light-shielding coating film in which light-shielding pigments are dispersed in a transparent resin, has generally photosensitivity attached thereto, and is obtained by pattern formation using the method of photolithography including exposure/development.

Figure 15:
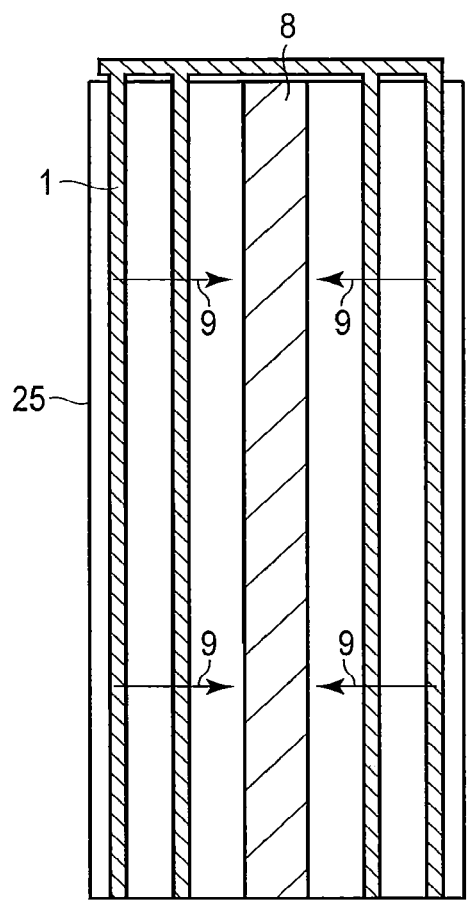
FIG. 15 is a diagram showing a pattern shape in a plane view of a first electrode applicable to an embodiment of the present invention.
Figure 16:
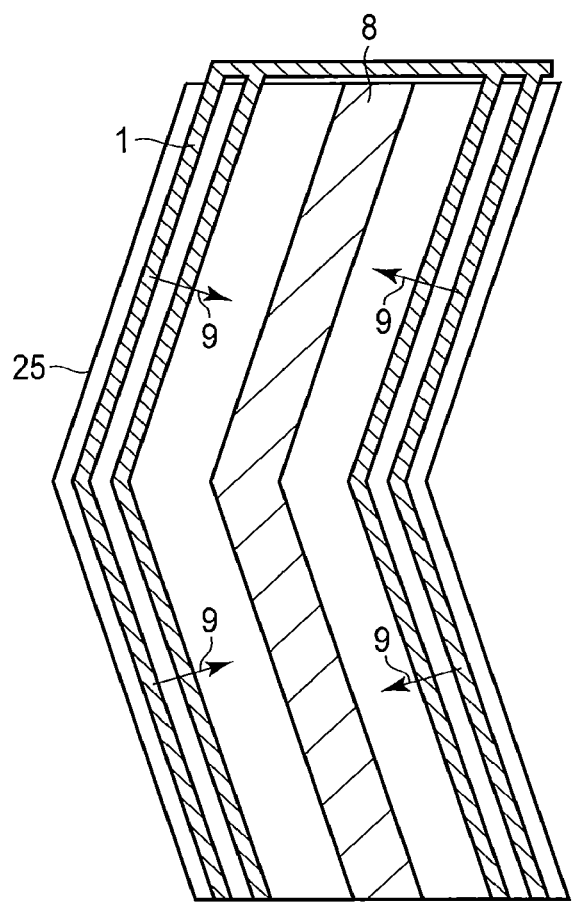
FIG. 16 is a diagram showing a pattern shape in the plane view of the first electrode applicable to an embodiment of the present invention.

The pixel refers to an opening of a black matrix and is synonymous with the picture element. The pixel normally has a polygonal shape, particularly a polygonal shape in which opposite sides are parallel. Polygons in which opposite sides are parallel include a quadrangle like a rectangle shown in FIG. 15, a parallelogram shown in FIGS. 17 and 18, a hexagon, and a polygon bent in the center of a pixel shown in FIG. 16.

The color layer is a coating film in which an organic pigment described later is dispersed in a transparent resin and is formed as a pattern on a rectangular pixel by the method of photolithography. A portion of a color pixel positioned above the linear resin layer described above and a superimposed portion on the black matrix are also called the color layer.

The liquid crystal that can be applied to the present invention is a liquid crystal whose initial alignment (when no drive voltage is applied) is vertically aligned or horizontally aligned. Alignment processing like rubbing can be omitted for a vertically aligned liquid crystal whose dielectric constant anisotropy is negative.

Conductive metal-oxides such as ITO described above can be used as a material of the first electrode and second electrode on the array substrate side of a liquid crystal display device according to the present embodiment. Alternatively, a metal whose conductivity is higher than that of metal-oxides may be adopted. Further, a thin film of aluminum or aluminum alloy may be used for one of the first electrode and second electrode for a reflective-type or semi-transflective liquid crystal display device. As shown in FIG. 1, a first electrode 1, a second electrode 2, and a metallic wire of an active element are formed via an insulating layer 22 such as silicon nitride (SiNx), silicon oxide (SiOx) or the like. In FIG. 1, a TFT element and metallic wires connected to the TFT element are omitted. Incidentally, the technology to form each of a gate wire and a source wire from a single layer of aluminum alloy having a low contact property with ITO as conductive metal-oxides is disclosed by Jpn. Pat. Appln. KOKAI Publication No. 2009-105424.

In the present embodiment, the relative dielectric constant of a color layer is a relatively important property, but is almost uniquely determined by the ratio of the organic pigment added as a coloring agent to the transparent resin and it is difficult to change the relative dielectric constant significantly. In other words, the type of organic pigment and content in the color layer are set from the color purity necessary for a liquid crystal display device and also the relative dielectric constant in the color layer is thereby practically determined. The relative dielectric constant can be increased to 4 or more by increasing the ratio of the organic pigment and making the color layer thinner. The relative dielectric constant can be increased a little by using a high refractive index material as the transparent resin. The relative dielectric constant of a color layer using the organic pigment generally falls within the range of 2.9 to 4.5.

The thickness of a color layer or resin layer may be optimized in relation to a cell gap of the liquid crystal to be used (thickness of the liquid crystal layer). If, for example, the thickness of a color layer or resin layer becomes thinner from the viewpoint of necessary electric characteristics, the thickness of the liquid crystal layer can be increased. If the thickness of the former is thick, the thickness of the liquid crystal layer can correspondingly be made thinner. Incidentally, the resin layer is synonymous with the protective layer formed of a transparent resin such as an acrylic resin described later.

The linear resin layer as a component of a color filter substrate or liquid crystal display device according to the present embodiment is formed of a transparent resin in the visible range. When a coloring material is dispersed in such a linear resin layer, the color balance during dynamic display of the red pixel, green pixel, and blue pixel can be adjusted. The thickness of the color layer in a laminated portion with the linear resin layer only needs to be a thin thickness necessary for dynamic display and can appropriately be adjusted depending on the liquid crystal display device or the liquid crystal to be applied. Normally, the thickness of ⅓ to ¼ the pixel thickness (thickness of the color layer in the normal display area) allows visual recognition of coloring sufficiently and thus, the thickness about ¼ the pixel thickness may be adopted.

By changing the relative dielectric constant or thickness of the linear resin layer, responsiveness (amount of inclination of alignment) to the applied voltage to the liquid crystal near the projection above the linear resin layer can be adjusted. The linear resin layer can also be caused to contain particles of a high refractive index or a material having dielectric constant anisotropy.

In the halftone display of a liquid crystal display device of initial vertical alignment or initial horizontal alignment after the application of a drive voltage, the display may take on a yellow tinge depending on the viewing angle in the oblique direction. In the present embodiment, such unintended coloring can be reduced by simply fine-tuning the thickness of the color layer laminated with the linear resin layer or in contact with the linear resin layer. To counter an increasing yellow tinge, the transmittance of the blue pixel may be increased. As a simple method of realizing the increased transmittance, the blue transmitted light can relatively be increased by increasing the width or height of the linear resin layer formed in the blue pixel. Conversely, the width or height of the linear resin layer formed in the red pixel or green pixel may be decreased. The thickness of the color layer formed on the linear resin layer or the area of a dynamic display area described later is varied by adjusting the width/height of the linear resin layer and, as a result, the transmittance of the color pixel can be adjusted so that the color balance can be adjusted.

Normally, in a transmissive liquid crystal display device, the white balance is optimized by tuning optical characteristics of optical members such as a phase difference layer and the thickness of a liquid crystal under the assumption of light transmission from a backlight. When a transmissive liquid crystal display device is used as a reflective display or transflective liquid crystal display device, there is an optical path difference or a difference in incident light and the double refraction factor of optical members cannot be made the same as that of the transmissive display and thus, a subtle color shift arises. When a color filter substrate according to the present embodiment is used not only for a transmissive display, but also for a reflective display or transflective liquid crystal display device, the color balance can be adjusted by adjusting the width or height of the linear resin layer by color to change the thickness or area of the color layer.

The linear resin layer extends in a direction perpendicular to the paper surface in FIG. 1 or the like, but may also extend in a direction parallel to the paper surface, that is, in a cross direction. In such a case, also the comb-like first and second electrodes need to be arranged in the cross direction.

Instead of the linear resin layer, a cross-shaped resin layer in a plane view may also be provided.

In the present embodiment, liquid crystals of both negative dielectric constant anisotropy and positive dielectric constant anisotropy can be used. For example, a nematic liquid crystal whose double refraction factor near room temperature is about 0.1 can be used as a liquid crystal of negative dielectric constant anisotropy. A liquid crystal of positive dielectric constant anisotropy has a wide selection range and thus, various liquid crystal materials can be applied. The thickness of the liquid crystal layer is not specifically limited, but to realize a liquid crystal display of ultra high-speed response, a thin liquid crystal layer of the thickness of 3.5 µm or less, preferably in the range of 1.5 µm to 3.4 µm can be created. In the present invention using both an oblique electric field and protruding electrode technology, a liquid crystal display device whose power consumption is lower than before can be provided by optimizing the viscosity of liquid crystal, its dielectric constant anisotropy, double refraction factor, and elastic constant. And of the liquid crystal layer that can be effectively used in the present embodiment is in the range of about 250 nm to 500 nm.

As an alignment layer whose illustration is omitted, for example, a polyimide polymeric organic film or a polymeric organic film having a polysiloxane structure after being hardened by heating can be used. Alternatively, one to three phase difference plates may be used in a form of pasting to a polarizing plate.

The action in a configuration in which a transparent conducting film is laminated as a third electrode on a color filter substrate according to the present embodiment and the action of a recess on a black matrix and a superimposed portion of a linear resin layer and a color layer will be described below.

FIG. 1 is a schematic sectional view of a liquid crystal display device according to the first embodiment of the present invention. The liquid crystal display device has a configuration in which a color filter substrate for a liquid crystal display device (hereinafter, referred to as a color filter substrate) 11 and an array substrate 21 are provided in a form of sandwiching a liquid crystal 17 therebetween. A color filter substrate 11 is configured by sequentially forming a black matrix 5, a third electrode 3 as a transparent conducting film, a linear resin layer 4, a read pixel 15, a green pixel 14, a blue pixel 16, and a protective layer 18 on a transparent substrate 10a. A recess 23 is formed above (below in FIG. 1) the black matrix 5. The array substrate 21 has a first electrode 1 and a second electrode 2 formed on a transparent substrate 10b via an insulating layer 22. The illustration of an alignment film, polarizing plate, phase difference plate and the like is omitted.

Figure 2:
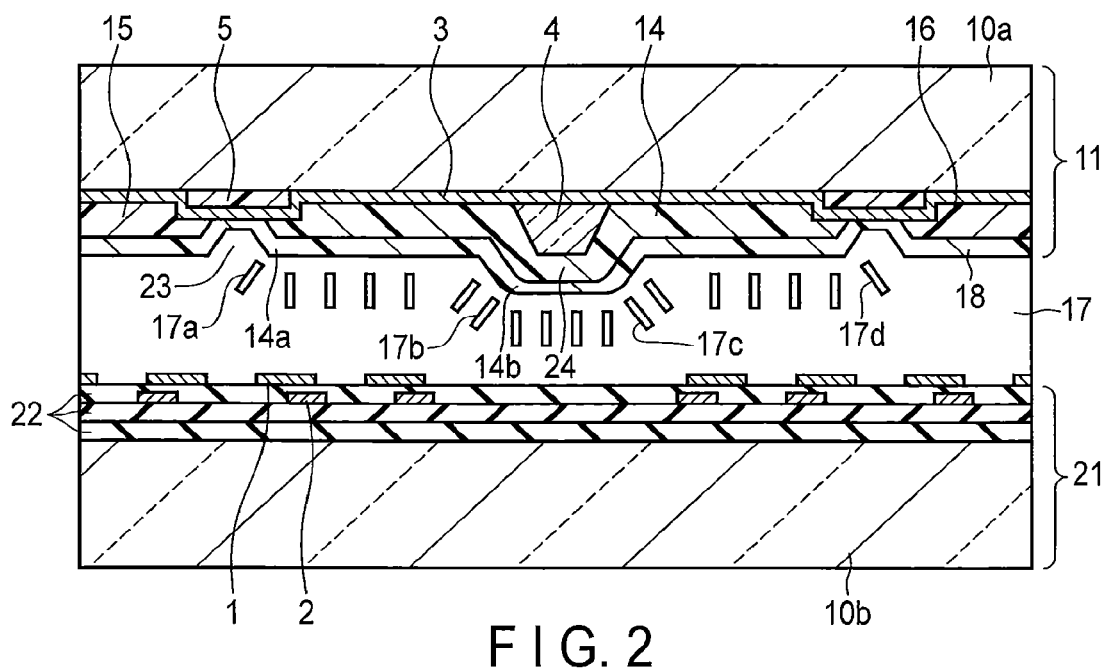
FIG. 2 is a sectional view showing an initial alignment state of a vertically aligned liquid crystal on a green pixel of the liquid crystal display device shown in FIG. 1.

FIG. 2 is a sectional view showing an alignment state of a vertically aligned liquid crystal 17 on the green pixel 14 as a rectangular pixel in a plane view in FIG. 1. The polarizing plate is assumed to be a cross Nicol prism and a normally black liquid crystal display device is assumed. FIG. 2 shows alignment states of liquid crystal molecules 17a, 17b, 17c, 17d of the vertically aligned liquid crystal 17 when no voltage is applied to the third electrode 3 as a transparent conducting film provided on the color filter substrate and the first electrode 1 and the second electrode 2 provided on the array substrate 21.

While the liquid crystal in the center of the green pixel 14 (½ pixel) is aligned perpendicularly to the surface of the green pixel, the liquid crystal molecules 17a, 17d of a shoulder portion 14a of the recess 23 and the liquid crystal molecules 17b, 17c of a shoulder portion 14b of the projection 24 are slightly obliquely aligned.

Figure 3:
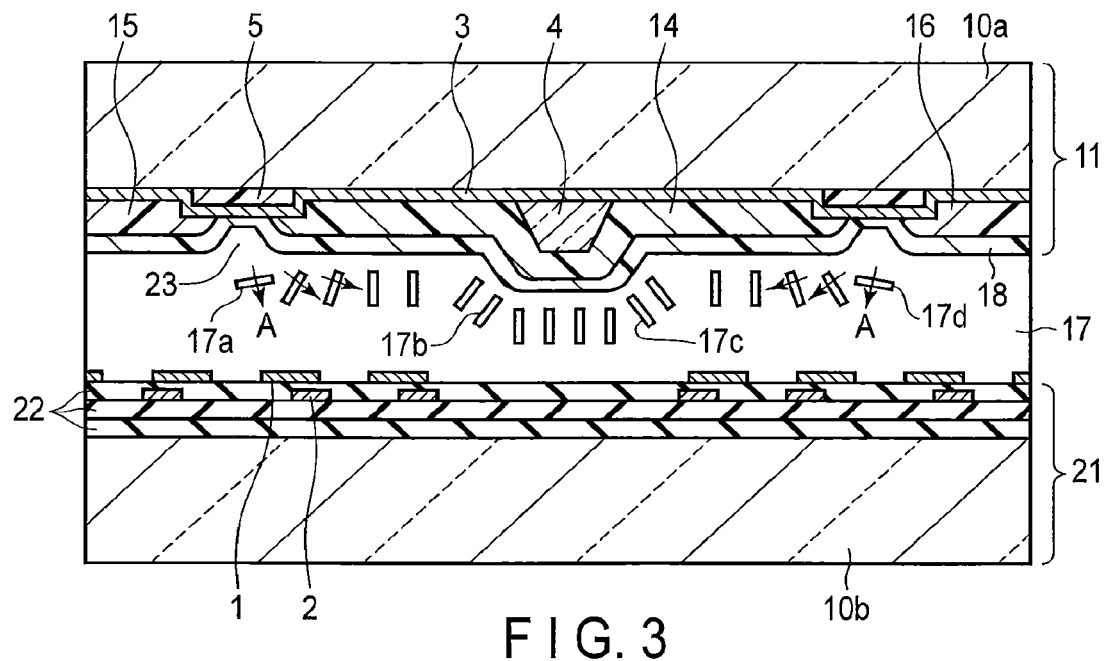
FIG. 3 is a diagram illustrating a motion of liquid crystals beginning to incline immediately after a drive voltage being applied in the liquid crystal display device shown in FIG. 1.
Figure 4:
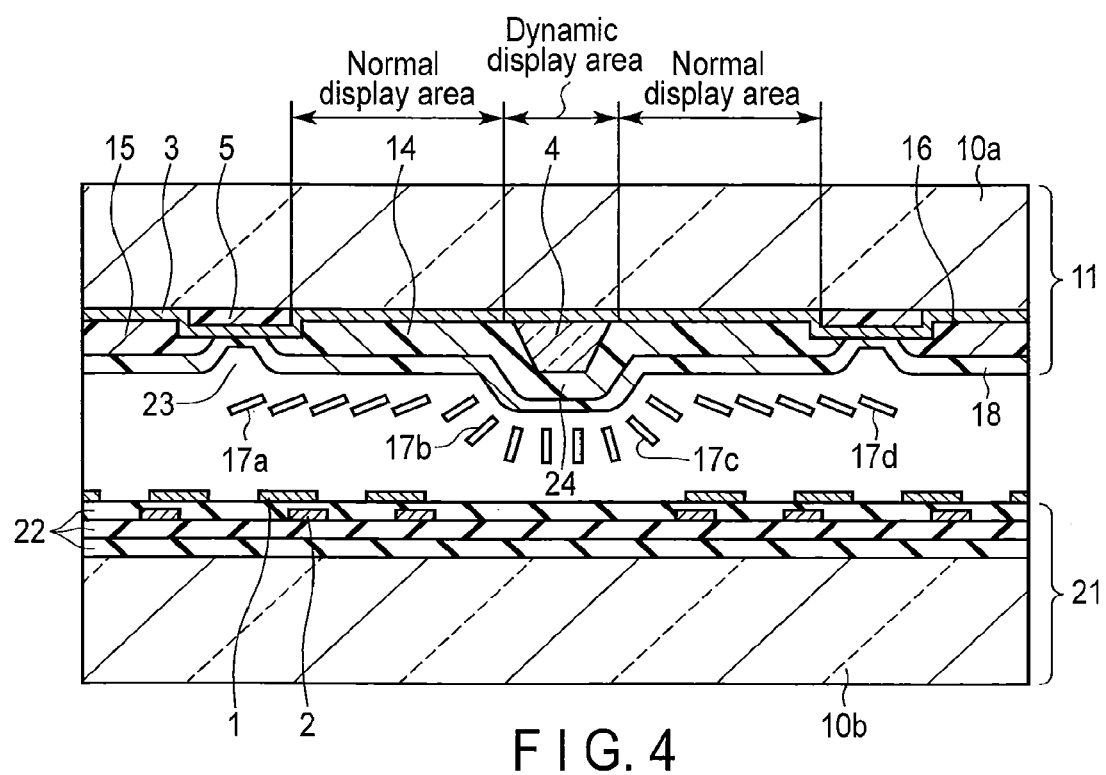
FIG. 4 is a diagram showing an alignment state of liquid crystal molecules during a white display (a green pixel in the figure) after the drive voltage being applied in the liquid crystal display device shown in FIG. 1.

If, as shown in FIG. 3, a liquid crystal driving voltage is applied while the liquid crystal molecules 17a, 17b, 17c, 17d are obliquely aligned, the liquid crystal molecules 17a, 17d incline in the direction of an arrow A. Liquid crystal molecules near the recess 23 above the black matrix 5 are closer to the third electrode 3 as a transparent conducting film due to the recess, are more likely to be subject to an applied voltage between the third electrode and the first electrode as a pixel electrode, and start to incline immediately after the voltage being applied. The inclination of the liquid crystal molecules 17a, 17d functions as a trigger and the inclination propagates to adjacent liquid crystal molecules and, as shown in FIG. 4, the liquid crystal inclines in a direction of the center of the rectangular pixel where the linear resin pixel 4 is formed to change to the green display due to light transmission. That is, the normal transmission area shown in FIG. 4 is in the green display during normal gradation display.

FIG. 4 is a diagram showing an alignment state of liquid crystal molecules during a white display (FIG. 4 is shown with a green pixel and thus, the color specification is green) after the drive voltage being applied. As shown in FIG. 4, liquid crystal molecules in the normal display area are aligned almost in parallel with the substrate surface. Liquid crystal molecules above the projection 24 in the center of the rectangular pixel with the linear resin layer as a core remain vertically aligned or do not incline sufficiently in the green display (normal display area in FIG. 4) during gradation display and thus, the dynamic display area in the pixel center becomes a black or dark display. The liquid crystal molecules 17a, 17b, 17c, 17d in the shoulder portions of the recess and the projection practically have a tilt attached thereto when no voltage is applied without performing alignment processing such as rubbing.

As shown in FIG. 4, the direction in which the liquid crystals incline is reversed in the ½ pixel on the opposite side (right side) of the green pixel 14. This means that optical compensation in the halftone display can be made only by the magnitude of the drive voltage and a wide angle of visibility can be secured without forming four multi-domains like an MVA liquid crystal. In the halftone (for example, a state in which each liquid crystal molecule is oblique), the liquid crystal alignment in which the ½ green pixel and the ½ green pixel on the opposite side have inclination gradients in the opposite direction and these ½ pixels facing with each other optically average to widen the angle of visibility.

Figure 5:
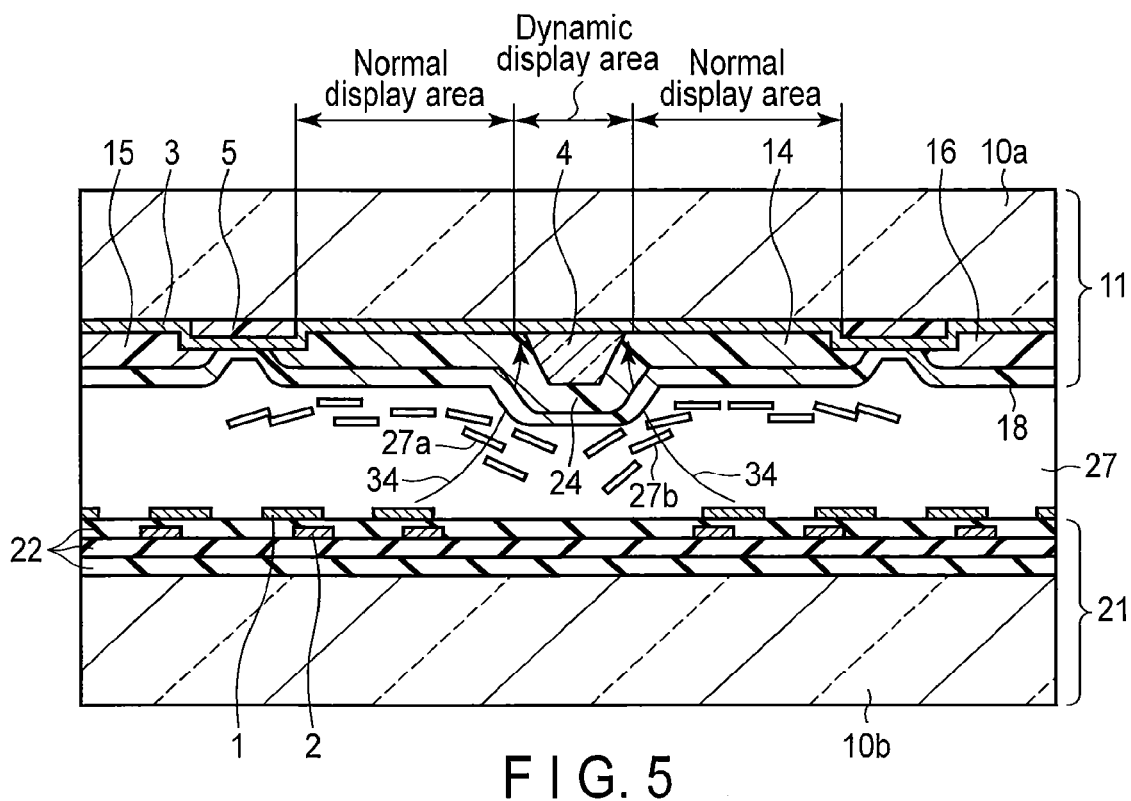
FIG. 5 is a diagram showing the alignment state of liquid crystal molecules during high-luminance display by a still higher voltage being applied to the liquid crystal display device shown in FIG. 1.

FIG. 5 is a diagram illustrating the alignment of the liquid crystal when a still higher voltage is applied. That is, with the application of a still higher voltage, liquid crystal molecules 27a, 27b near the projection 24 are aligned in a direction perpendicular to an electric line of force 34 (aligned in a direction parallel to the surface of the substrate 10b). Due to the alignment of the liquid crystal molecules 27a, 27b described above, light is transmitted through the dynamic display area. A thin color layer is stacked on the linear resin layer 4 in the dynamic display area and thus, bright green is displayed in the state shown in FIG. 5. Because the linear resin layer as a dielectric material and the color layer are formed on the third electrode 3 thickly in the projection 24, in contrast to the normal pixel area, a voltage higher than that for normal display is needed as a drive voltage to drive the liquid crystal molecules 27a, 27b.

By disposing two TFT elements (active elements) in one pixel and driving a set of first electrodes on the inner side near the dynamic display area shown in FIG. 5 by one TFT element separately, the brightness of the dynamic display can advantageously be adjusted independently.

In the foregoing, behavior of liquid crystal molecules near the color filter substrate has been described, in a liquid crystal display device according to another embodiment of the present invention, liquid crystal molecules can be inclined in similar directions also on the side of the array substrate like on the side of the color filter substrate. Such an example will be described below as a case when a liquid crystal whose dielectric constant anisotropy is negative is used.

Figure 6:
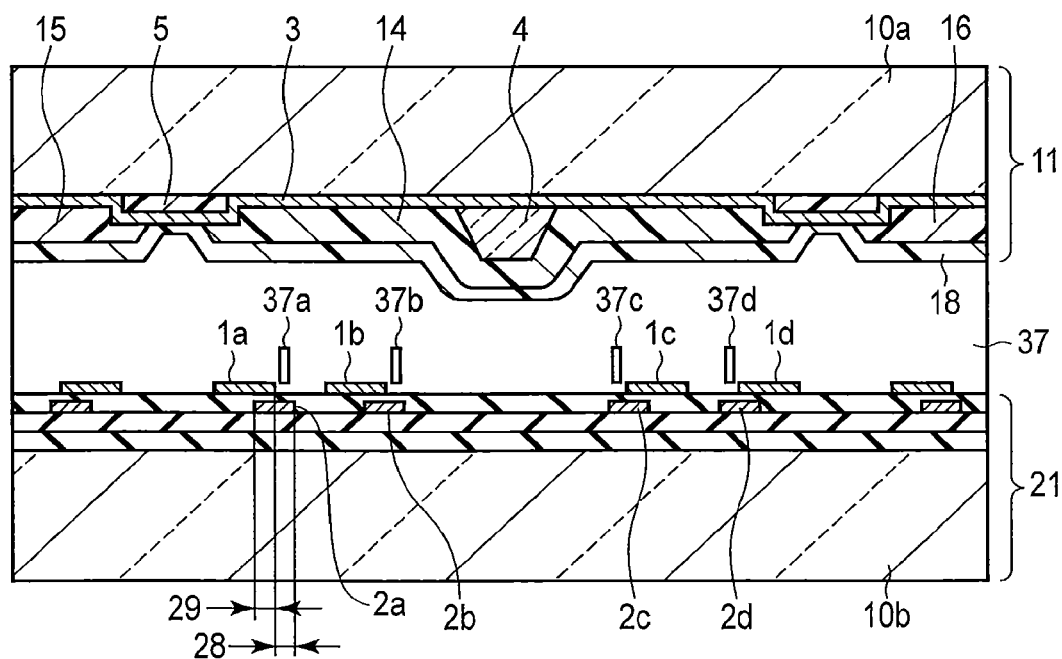
FIG. 6 is a diagram showing liquid crystal molecules vertically aligned near a first electrode when a comb-like pattern is adopted for the first and second electrode in the vertically aligned liquid crystal display device shown in FIG. 1.

In the liquid crystal display device shown in FIG. 6, the first electrode is set as comb-like electrodes 1a, 1b, 1c, 1d and similarly, the second electrode is set as comb-like electrodes 2a, 2b, 2c, 2d. Liquid crystal molecules 37a, 37b, 37c, 37d near the first electrodes 1a, 1b, 1c, 1d are aligned almost vertically when no voltage is applied.

In the liquid crystal display device shown in FIG. 6, the second electrodes 2a, 2b, 2c, 2d are arranged by shifting so as to protrude from ends of the first electrodes 1a, 1b, 1c, 1d so that ends thereof topple the liquid crystal 37a in the direction of a projection 24 in the center of the rectangular pixel when a drive voltage is applied. An amount of shift 28 can be adjusted in various ways by dimensions like liquid crystal materials to be used, the drive voltage, and the thickness of liquid crystal cells. A small amount like 1 μm to 5 μm is sufficient as the amount of shift 28. The width of an overlapping portion of the first electrodes 1a, 1b, 1c, 1d and the second electrodes 2a, 2b, 2c, 2d respectively is indicated as reference numeral 29. The illustration of an alignment film is omitted. The overlapping portion can be used as an auxiliary capacity when necessary.

FIG. 7 shows an operation of the liquid crystal molecules 37a, 37b, 37c, 37d immediately after the voltage to drive the liquid crystal being applied and also electric lines of force 30a, 30b, 30c, 30d. The liquid crystal molecules 37a, 37b, 37c, 37d incline in the direction of electric lines of force after the voltage application. The direction in which the liquid crystal molecules incline is the same as the direction in which the liquid crystal molecules 17a, 17b, 17c, 17d shown in FIG. 3 incline and thus, the liquid crystal molecules in the illustrated green pixel 14 inclines instantaneously in the same direction so that responsiveness of the liquid crystal can significantly be improved.

Figure 8:
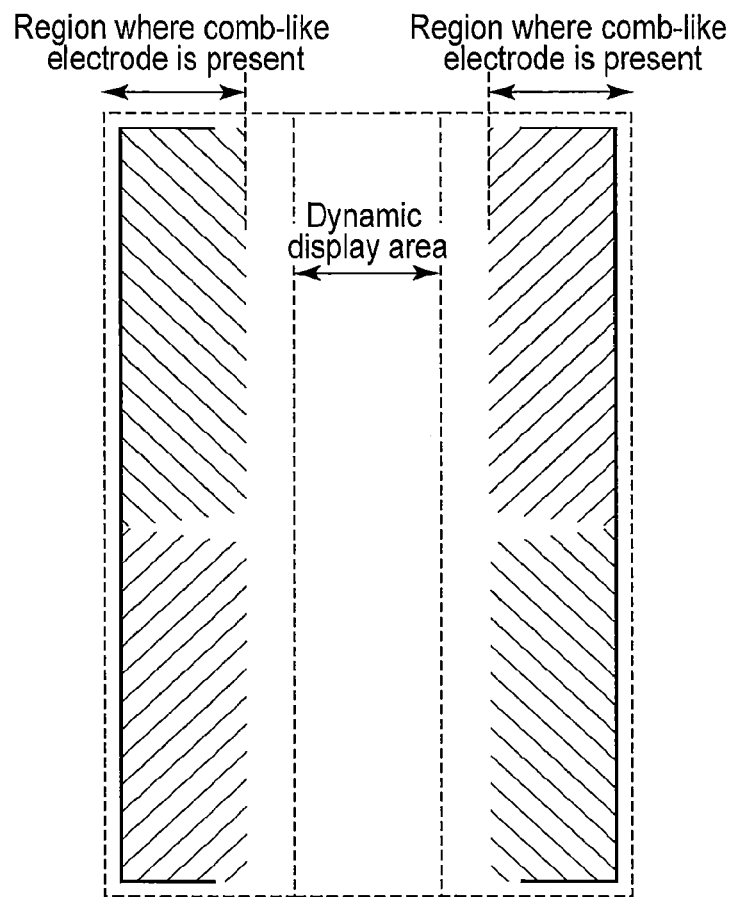
FIG. 8 is a diagram showing a comb-like pattern whose alignment is changed by 90° in units of ¼ pixel.

The direction of shift (protruding portion) of the second electrode is desirably symmetric with respect to a point or line in the center of the rectangular pixel and in the opposite directions. In addition, the shift is desirably a pattern protruded in a direction toward the linear resin layer in a plane view. The pattern of a comb-like electrode may be a V shape or oblique. Alternatively, as shown in FIG. 8, the pattern may be a comb-like pattern whose alignment is changed by 90° in units of ¼ pixel. Accordingly, when the voltage to drive the liquid crystal is applied, the inclinations are divided into four domains symmetrically with respect to a point in a plane view and the display area of the rectangular pixel is divided into 4 domain areas. In this case, the comb-like electrode can be oblique in the direction of 45° with respect to the center line of the rectangular pixel. Also, these electrode patterns are desirably symmetric with respect to a point or line when viewed from the pixel center. The numbers of first electrodes and second electrodes can appropriately be selected.

While the voltage to drive the liquid crystal is applied to a first electrode 1, a common potential (common) may be set to a second electrode 2 and a third electrode 3. The overlapping portion 29 of the first and second electrodes shown in FIG. 6 can be used as an auxiliary capacity.

Other examples of the plane view pattern shape of the first electrode 1 that can be applied to the above embodiment are shown in FIGS. 15, 16, 17, and 18. In FIGS. 15, 16, 17, and 18, reference numeral 25 shows an opening (color pixel shape of a polygon) of a black matrix 5 and reference numeral 9 shows the direction in which the liquid crystals incline. FIGS. 17 and 18 illustrate the opening 25 in two pixels having different angle of obliquity. That is, if the drive voltage is applied to the first electrode 1 and the common potential (common) is set to the second electrode 2 and the third electrode 3, liquid crystal molecules in these pixels incline in the direction 9 in units of ½ pixels. In pixels in parallelogrammic shapes having different angle of obliquity, for example, in pixels in FIGS. 17 and 18, four different directions in which the liquid crystals incline can be set in total so that a liquid crystal display device with a wide angle of visibility can be provided.

The liquid crystal operation has been described by taking a liquid crystal of initial vertical alignment having negative dielectric constant anisotropy as an example, but a similar effect can be achieved by using a liquid crystal of initial horizontal alignment having positive dielectric constant anisotropy. Therefore, the present invention can use a horizontally aligned liquid crystal. In an initially horizontally aligned liquid crystal, the liquid crystal rises vertically from the surface of the substrate 10b after the application of the drive voltage so that light is transmitted. When a horizontally aligned liquid crystal is used, rubbing treatment of the alignment film is needed to uniquely determine the alignment direction of the liquid crystal.

The first electrode and second electrode in FIGS. 6 and 7 have a comb-like pattern, but may have, instead of the comb-like pattern, a slit pattern cutting an opening like a slit. Also the slit pattern can obtain a similar effect by protruding the second electrode from the end of the first electrode in the direction of the linear resin layer.

The following method can be used to make the direction of the inclination of liquid crystal molecules above protruding portions of the second electrodes 2a, 2b, 2c, 2d easier.

1) Attach a taper to the ends of the first electrodes 1a, 1b, 1c, 1d

2) Make the thickness of the first electrodes 1a, 1b, 1c, 1d thicker 3) Etch a portion of the insulating layer below the first electrodes 1a, 1b, 1c, 1d to make the insulating layer on the second electrodes 2a, 2b, 2c, 2d thinner.

By attaching a small pre-tilt angle of, for example, 0.1° to 1° to initially vertically aligned liquid crystal molecules in this manner, inclining liquid crystal molecules can be aligned and liquid crystal molecules can be made more likely to incline at a low voltage so that responsiveness is improved and also improvements in low gradation display are made. The pre-tilt angle is a pre-tilt amount when the direction perpendicular to the substrate surface is set to 0°.

By using, for example, an oxide semiconductor as a channel material of the TFT as an active element provided in a liquid crystal display device, the aperture ratio of a pixel can be improved. Typical examples of the oxide semiconductor include a compound metal-oxides of indium, gallium, and zinc called IGZO.

A liquid crystal material (fluorine liquid crystal) containing fluorine atoms in a molecular structure can be used as a liquid crystal material. A strong electric field is practically generated in a protruding portion of the second electrode from the first electrode when a voltage to drive the liquid crystal is applied and thus, the liquid crystal can be driven by using a liquid crystal material whose dielectric constant is lower (dielectric constant anisotropy is smaller) than that of a conventional liquid crystal used for vertical alignment. In general, a liquid crystal having small dielectric constant anisotropy has a low viscosity and can make the fall time when the drive voltage is turned off shorter. In addition, a fluorine liquid crystal has a small dielectric constant and thus, the captured amount of ionic impurities is small and degradation in performance such as lower voltage retention caused by impurities is small, providing advantages of less display irregularities and burn-in.

Transparent resins and organic pigments that can be used for a color filter substrate according to the embodiments described above will be illustrated below.

(Transparent Resin)

A photosensitive coloring composition used for forming a light-shielding layer or color layer contains, in addition to pigment dispersion, a polyfunctional monomer, photosensitive resin or non-photosensitive resin, polymerization initiator, solvent and the like. Highly transparent organic resins that can be used for the embodiments of the present invention such as the photosensitive resin and non-photosensitive resin will generically be called transparent resins.

Transparent resins include thermoplastic resins, thermosetting resins, and photosensitive resins. Thermoplastic resins include, for example, a butyral resin, styreme-maleate copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene resin, polyamide resin, rubber resin, cyclorubber resin, celluloses, polybutadiene, polyethylene, polypropylene, and polyimide resin. Thermosetting resins include, for example, an epoxy resin, benzoguanamine resin, rosin modified maleic resin, rosin modified fumaric resin, melamine resin, urea resin, and phenolic resin. A resin obtained by allowing a melamine resin and a compound containing an isocyanate group to react may be used as a thermosetting resin.

(Alkali Soluble Resin)

It is preferable to use a photosensitive resin composition capable of forming a pattern by photolithography to form a light-shielding layer, light scattering layer, color layer, and cell gap regulating layer. Such transparent resins are preferably resins to which alkali solubility is attached. Alkali soluble resins are not specifically limited as long as a resin contains a carboxyl group or hydroxyl group. For example, an epoxy acrylate resin, novolac resin, polyvinyl phenolic resin, acrylic resin, carboxyl group containing epoxy resin, and carboxyl group containing urethane resin. Among others, the epoxy acrylate resin, novolac resin, and acrylic resin are preferable and the epoxy acrylate resin and novolac resin are particularly preferable.

(Acrylic Resin)

The following acrylic resins can be illustrated as representative transparent resins that can be adopted for the above embodiments.

Acrylic resins include as monomers, for example, (meta)acrylic acid; alkyl(meta)acrylate such as methyl(meta)acrylate, ethyl(meta)acrylate, propyl (meta)acrylate, butyl(meta)acrylate, t-butyl(meta) acrylatebenzyl(meta)acrylate, and lauryl(meta) acrylate; hydroxyl group containing (meta)acrylate such as hydroxylethyl(meta)acrylate and hydroxylpropyl (meta)acrylate; ether containing (meta) acrylate such as ethoxyethyl(meta)acrylate and glycidyl(meta)acrylate; and a polymer obtained by using alicyclic(meta)acrylate such as cyclohexyl (meta)acrylate, isobornyl(meta)acrylate, and dicyclopentenyl(meta)acrylate.

The monomers cited above can be used alone or combining two or more monomers. Further, a copolymer obtained by copolymerizing these monomers with a compound such as styrene, cyclohexyl maleimide, and phenyl maleimide that can be copolymerized may be used.

A resin having photosensitivity can also be obtained by causing to react a copolymer obtained by copolymerizing, for example, carboxylic acid having an ethylene unsaturated group such as (meta)acrylic acid and a compound containing an epoxy group and unsaturated double bonds such as glycidyl methacrylate or adding a carboxylic acid containing compound such as (meta)acrylic acid to a polymer of epoxy group containing (meta)acrylate such as glycidyl methacrylate or a copolymer of epoxy group containing (meta)acrylate and other (meta)acrylate.

Further, a resin having photosensitivity can also be obtained by causing, for example, a polymer having a hydroxyl group of a monomer such as hydroxylethyl methacrylate to react with a compound having an isocyanate group and ethylene unsaturated group such as methacryloyl oxyethylisocyanate.

Also, as described above, a resin having a carboxyl group can be obtained by causing a copolymer having a plurality of hydroxyl groups such as hydroxylethyl methacrylate and polybasic acid anhydride to introduce a carboxyl group into a copolymer. However, the method of producing a resin having a carboxyl group is not limited to the above method.

Examples of anhydride used for the above reaction include, for example, malonic anhydride, succinic anhydride, maleic anhydride, itaconic anhydride, phthalic anhydride, tetrahydrophthalic anhydride, hexahydrophthalic anhydride, methyl tetrahydrophthalic anhydride, and trimellitic anhydride.

The solid content acid value of the above acrylic resins is preferably 20 to 180 mgKOH/g. If the acid value is less than 20 mgKOH/g, the developing speed of a photosensitive resin composition is too slow and a more time is needed for development, which tends to result in low productivity. If the solid content acid value is more than 180 mgKOH/g, conversely the developing speed is too fast, which tends to result in pattern peeling or missing pattern after development.

Further, if the above acrylic resin has photosensitivity, the double-bond equivalent of the acrylic resin is desirably 100 or more, more desirably 100 to 2000, and most desirably 100 to 1000. If the double-bond equivalent exceeds 2000, adequate photo-setting properties may not be obtained.

(Photopolymerization Monomer)

Examples of the photopolymerization monomer include various kinds of acrylate such as 2-hydroxylethyl(meta)acrylate, 2-hydroxypropyl(meta)acrylate, cyclohexyl(meta)acrylate, polyethyleneglycol di(meta)acrylate, pentaerythritol (meta)acrylate, trimethylolpropan tri(meta)acrylate, dipentaerythritol hexa(meta)acrylate, tricyclodecanyl(meta)acrylate, melamine(meta)acrylate, and epoxy(meta)acrylate, and methacrylate, (meta)acrylic acid, styrene, vinyl acetate, (meta)acrylamide, N-hydroxymethyl(meta)acrylamide, and acrylonitrile.

It is preferable to use polyfunctional urethane acrylate obtained by causing (meta)acrylate having a hydroxyl group and polyfunctional isocyanate to react and having a (meta)acryloyl group. The combination of (meta)acrylate having a hydroxyl group and polyfunctional isocyanate is arbitrary and is not specifically limited. Also, one type of polyfunctional urethane acrylate may be used alone or two types or more may be combined.

(Photopolymerization Initiator)

As photopolymerization initiators, an acetophenone compound such as 4-phenoxy dichloroacetophenone, 4-t-butyl-dichloroacetophenone, diethoxyacetophenone, 1-(4-isopropyl phenyl)-2-hydroxy-2-methylpropane-1-on, 1-hydroxycyclohexyl phenyl ketone, and 2-benzyl-2-dimethylamino-1-(4-morpholino phenyl)-butane-1-on; a benzoin compound such as benzoin, benzoin methyl ether, benzoin ethyl ether, benzoin isopropyl ether, and benzyl dimethylketal; a benzophenone compound such as benzophenone, benzoylbenzoate, methyl benzoylbenzoate, 4-phenyl-benzophenone, hydroxybenzophenone, acrylic benzophenone, and 4-benzoyl-4'-methyldiphenylsulfide; a thioxanthene compound such as thioxanthene, 2-chlorothioxanthene, 2-methylthioxanthene, isopropylthioxanthene, and 2, 4-diisopropylthioxanthene; a triazine compound such as 2, 4, 6-trichloro-s-triazine, 2-phenyl-4,6-bis (trichloromethyl)-s-triazine, 2-(p-methoxyphenyl)-4,6-bis(trichloromethyl)-s-triazine, 2-(p-tolyl)-4, 6-bis(trichloromethyl)-s-triazine, 2-pipenyl-4, 6-bis (trichloromethyl)-s-triazine, 2, 4-bis (trichloromethyl)-6-styryl s-triazine, 2-(naphtho-1-yl)-4, 6-bis(trichloromethyl)-s-triazine, 2-(4-methoxy-naphtho-1-yl)-4, 6-bis(trichloromethyl)-s-triazine, 2, 4-trichloromethyl-(piperonyl)-6-triazine, and 2, 4-trichloromethyl (4'-methoxy-styryl)-6-triazine, an oxime ester compound such as 1, 2-octanedione, 1-[4-(phenylthio)-, 2-(O-bemzoyloxime)] and O-(acetyl)-N-(1-phenyl-2-oxo-2-(4'-methoxy naphthyl) ethylidene)hydroxylamine; a phosphine compound such as bis(2, 4, 6-trimethylbenzoyl)phenylphosphine oxide and 2, 4, 6-trimethylbenzoyl diphenylphosphine oxide; a quinone compound such as 9, 10-phenanthrene quinone, camphor quinone, and ethyl anthraquinone; a borate compound; a carbazole compound; an imidazole compound; and a titanocene compound can be cited. Oxime derivatives (oxime compounds) are effective to improve sensitivity. These photopolymerization initiators can be used alone or by combining two or more.

(Sensitizer)

It is preferable to use photopolymerization initiators and sensitizers in combination. As sensitizers, compounds such as α-acyloxy ester, acylphosphine oxide, methylphenyl glyoxylate, benzyl-9, 10-phenanthrene quinone, camphor quinone, ethyl anthraquinone, 4, 4'-diethyl isophthalophenone, 3, 3', 4, 4'-tetra (t-butylperoxy carbonyl)benzophenone, and 4, 4'-diethylamino benzophenone.

An quantity of 0.1 to 60 mass parts of sensitizers to 100 mass parts of photopolymerization initiators can be contained.

(Ethylene Unsaturated Compound)

The above photopolymerization initiators are preferably used by being combined with ethylene unsaturated compounds. The ethylene unsaturated compound means a compound having at least one ethylene unsaturated bond in the molecule. Among others, an ethylene unsaturated compound having two ethylene unsaturated bonds in the molecule or more is preferably from the viewpoint of being able to increase differences in polymerizability, cross linkage, and developer solubility between an exposed portion and a non-exposed portion accompanying the polymerizability and cross linkage. Particularly, a (meta)acrylate compound whose unsaturated bond is derived from a (meta)acryloyloxy group is preferable.

Compounds containing at least one ethylene unsaturated bond in the molecule include, for example, unsaturated carboxylic acid such as (meta)acrylic acid, crotonic acid, isocrotonic acid, maleic acid, itaconic acid, and citraconic acid and acrylate thereof; (meta)acrylonitrile; (meta)acrylamide; and styrene. Compounds containing two ethylene unsaturated bonds or more in the molecule typically include, for example, esters of unsaturated carboxylic acid and polyhydroxyl compounds, (meta)acryloyloxy group containing phosphates, urethane(meta)acrylates of hydroxyl(meta)acrylate compounds and polyisocyanate compounds, and epoxy(meta)acrylates of hydroxyl(meta)acrylate compounds and polyepoxy compounds.

The above photopolymerization initiators, sensitizers, and ethylene unsaturated compounds may be added to a composition containing polymerization liquid crystal compounds used for forming a phase difference layer described later.

(Polyfunctional Thiol)

Polyfunctional thiol acting as a chain transfer agent can be contained in a photosensitive coloring composition. Polyfunctional thiol may be any compound having two thiol groups or more and includes, for example, hexanedithiol, decanedithiol, 1, 4-butanediolbisthio propionate, 1, 4-butanediolbisthio glycolate, ethyleneglycolbisthio glycolate, ethyleneglycolbisthio propionate, trimethylolpropanetristhio glycolate, trimethylolpropanetristhio propionate, trimethylolpropanetris (3-mercaptobutyrate), pentaerythritoltetrakisthio glycolate, pentaerythritoltetrakisthio propionate, trimercapto propionate tris(2-hydroxyethyl)isocyanurate, 1, 4-dimethylmercaptobenzene, and 2, 4, 6-trimercapto-s-triazine, 2-(N,N-dibutylamino)-4, 6-dimercapto-s-triazine.

The above polyfunctional thiol can be used alone or by combining two types or more. Polyfunctional thiol can be used in a photosensitive coloring composition in a quantity of preferably 0.2 to 150 mass parts, particularly preferably 0.2 to 100 mass parts to 100 mass parts of pigment.

(Storage Stabilizer)

Storage stabilizers can be contained in a photosensitive coloring composition to stabilize the viscosity with time of the composition. Storage stabilizers include, for example, quaternary ammonium chloride such as benzyltrimethyl chloride and diethylhydroxyamine, organic acid such as lactic acid and oxalic acid and methyl ether thereof, organic phosphine such as t-butylpyrocatechol, triethyl phosphine, and triphenyl phosphine, and phosphite. Storage stabilizers can be contained in a quantity of 0.1 to 10 mass parts to 100 mass parts of pigment in the photosensitive coloring composition.

(Close Contact Improver)

Close contact improvers such as a silane coupling agent can be contained in a photosensitive coloring composition to enhance close contact with a substrate. Silane coupling agents include vinylsilanes such as vinyltris(β-methoxyethoxy)silane, vinylethoxysilane, and vinyltrimethoxysilane, (meta)acrylsilanes such as γ-methacryloxypropyl trimethoxysilane, epoxysilanes such as β-(3, 4-epoxycyclohexyl)ethyltrimethoxysilane, β-(3, 4-epoxycyclohexyl)methyltrimethoxysilane, β-(3, 4-epoxycyclohexyl)ethyltriethoxysilane, β-(3, 4-epoxycyclohexyl)methyltriethoxysilane, γ-glycidoxypropyl trimethoxysilane, and γ-glycidoxypropyl triethoxysilane, aminesilanes such as N-β-(aminoethyl)γ-aminopropyl trimethoxysilane, N-β-(aminoethyl)γ-aminopropyl triethoxysilane, N-β-(aminoethyl)γ-aminopropyl methyldiethoxysilane, γ-aminopropyl triethoxysilane, γ-aminopropyl trimethoxysilane, N-phenyl-γ-aminopropyl trimethoxysilane, and N-phenyl-γ-aminopropyl triethoxysilane, and thiosilanes such as γ-mercaptopropyl trimethoxysilane and γ-mercaptopropyl triethoxysilane. The silane coupling agent can be contained in a quantity of 0.01 to 100 mass parts to 100 mass parts of pigment in the photosensitive coloring composition.

(Solvent)

Solvents such as water and organic solvents are mixed into a photosensitive coloring composition to enable uniform coating on a substrate. When the composition used for the present embodiment is a color layer of a color filter, the solvent also has a function to disperse the pigment uniformly. Solvents include, for example, cyclohexanone, ethylcellosolve acetate, butylcellosolve acetate, 1-methoxy-2-propyl acetate, diethyleneglycol dimethyl ether, ethylbenzene, ethyleneglycol diethyl ether, xylene, ethylcellosolve, methyl-n amylketone, propyleneglycol monomethyl ether, toluene, methylethyl ketone, ethyl acetate, methanol, ethanol, isopropyl alcohol, butanol, isobutyl ketone, and a petroleum solvent and these solvents may be used alone or by combining two or more. Solvents can be contained in a photosensitive coloring composition in a quantity of 800 to 4000 mass parts, preferably 1000 to 2500 mass parts to 100 mass parts of pigment.

(Organic Pigment)

As red pigments, for example, C. I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272, 279 or the like can be used.

As yellow pigments, for example, C. I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214 or the like can be cited.

As blue pigments, for example, C. I. Pigment Blue 15, 15:1, 15:2, 15:3, 15:4, 15:6, 16, 22, 60, 64, 80 or the like can be used. Among others, C. I. Pigment Blue 15:6 is preferable.

As violet pigments, for example, C. I. Pigment Violet 1, 19, 23, 27, 29, 30, 32, 37, 40, 42, 50 or the like can be used. Among others, C. I. Pigment Violet 23 is preferable.

As green pigments, for example, C. I. Pigment Green 1, 2, 4, 7, 8, 10, 13, 14, 15, 17, 18, 19, 26, 36, 45, 48, 50, 51, 54, 55, 58 or the like can be used. Among others, C. I. Pigment Green 58 is preferable.

In the description of pigment types of C. I. Pigment below, abbreviations like PB (Pigment Blue), PV (Pigment Violet), PR (Pigment Red), PY (Pigment Yellow), and PG (Pigment Green) may be described.

(Coloring Material of the Light-Shielding Layer)

A color material contained in the light-shielding layer or black matrix is a coloring material exhibiting a light-shielding function by having absorption in a visible light wavelength region. In the present embodiment, for example, organic pigments, inorganic pigments, dyes and the like can be cited as the coloring material. Inorganic pigments include, for example, carbon black and titanium oxide. As dyes, for example, azo dyes, anthraquinone dyes, phthalocyanine dyes, quinine imine dyes, quinoline dyes, nitro dyes, carbonyl dyes, and methine dyes can be cited. Organic pigments described above can be adopted as organic pigments. One light-shielding component may be used alone or two or more light-shielding components may be used in any combination and ratio. Higher volume resistance may be achieved by resin coating with the surface of these color materials or conversely, lower volume resistance may be achieved by increasing the content ratio of the coloring material to the base material of the resin to provide a little conductivity. However, the volume resistance of such light-shielding materials is approximately in the range of $1 \times 10^8$ to $1 \times 10^{15}$ Ω·cm, which is a level that does not affect the resistance of the transparent conducting film. Similarly, the relative dielectric constant of the light-shielding layer can be adjusted to the range of 3 to 11 by the selection of the color material and the content ratio.

(Dispersant/Dispersing Agent)

Using a macromolecular dispersant as a pigment dispersant is preferable because of superiority of dispersion stability with time. As the macromolecular dispersant, for example, a urethane dispersant, polyethyleneimine dispersant, polyoxyethylene alkyl ether dispersant, polyoxyethylene glycol diester dispersant, sorbitan aliphatic ester dispersant, and aliphatic modified polyester dispersant can be cited. Among others, a dispersant made of a graft copolymer containing particularly nitrogen atoms is preferable for a light-shielding photosensitive resin composition used in the present embodiment containing a large quantity of pigment in terms of development.

Concrete examples of these dispersants include as trade names EFKA (manufactured by EFKA Chemicals BV), Disperbik (manufactured by BYK Japan K.K.), DISPARLON (manufactured by Kusumoto Chemicals Ltd.), SOLSPERSE (manufactured by Lubrizol Corporation), KP (manufactured by Shin-Etsu Chemical Co. Ltd.), and POLYFLOW (manufactured by Kyoeisha Chemical Co. Ltd.) can be cited. One dispersant of these dispersants may be used alone or two or more dispersants may be used in any combination and ratio.

As the dispersing agent, for example, a pigment derivative can be used. As pigment derivatives, for example, azo, phthalocyanine, quinacridone, benzimidazolone, quinophthalone, isoindrinone, dioxazine, anthraquinone, indanthrene, perylene, perinone, diketopyrrolopyrrole, and dioxazine derivatives can be cited and, among others, quinophthalone derivatives are preferable.

As the substituent group of a pigment derivative, for example, a sulfonic group, sulfonamide group or quaternary salt thereof, phthalimidemethyl group, dialkylamino alkyl group, hydroxyl group, carboxyl group, or amide group bonded directly to pigment skeletons or via an alkyl group, aryl group, or heterocyclic group can be cited. Among others, the sulfonic group is preferable. These substituent groups may be substituted in a plurality of sites.

Concrete examples of the pigment derivatives include a sulfonic acid derivative of phthalocyanine, sulfonic acid derivative of quinophthalone, sulfonic acid derivative of anthraquinone, sulfonic acid derivative of quinacridone, sulfonic acid derivative of diketopyrrolopyrrole, and sulfonic acid derivative of dioxazine.

One dispersing agent or pigment derivative may be used alone or two or more dispersing agents or pigment derivatives may be used in any combination and ratio.

Various examples of the present invention will be described below.

EXAMPLE 1

Figure 9:
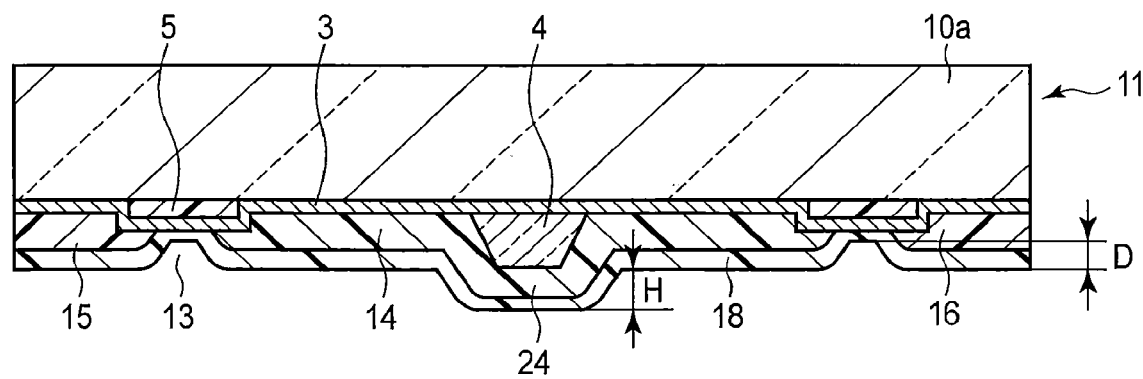
FIG. 9 is a partial sectional view showing a color filter substrate according to Example 1.

The color filter substrate 11 shown in FIG. 9 is produced as shown below.

[Formation of a Black Matrix]
(Dispersant for Black Matrix Formation)

20 mass parts of carbon pigment #47 (manufactured by Mitsubishi Chemical Corporation), 8.3 mass parts of macromolecular dispersant BYK-182 (BYK Japan K.K.), 1.0 mass part of copper phthalocyanine derivative (Toyo Ink Co. Ltd.), and 71 mass parts of propyleneglycol monomethylether acetate are stirred by a bead mill dispersion machine to prepare a carbon black dispersant.

(Photoresist for Black Matrix Formation)

A resist for black matrix formation is prepared by using the following materials:

Carbon black dispersant: Pigment #47 (Mitsubishi Chemical Corporation)
Transparent resin: V259-ME (Nippon Steel Chemical Co., Ltd.) (solid portion: 56.1% by weight)
Photopolymerization monomer: DPHA (Nippon Kayaku Co. Ltd.)
Initiator: OXE-02 (Ciba Specialty Chemicals K.K.)
OXE-01 (Ciba Specialty Chemicals K.K.)
Solvent: Propyleneglycol monomethylether acetate
Ethyl-3-ethoxypropionate
Leveling agent: BYK-330 (manufactured by BYK Japan K.K.)

The above materials are mixed and stirred in the following composition ratio to prepare a resist for black matrix formation (pigment concentration in the solid portion: about 20%).

| | |
|---|---|
| Carbon black dispersant | 3.0 mass parts |
| Transparent resin | 1.4 mass parts |
| Photopolymerization monomer | 0.4 mass parts |
| Photopolymerization initiator OXE-01 | 0.67 mass parts |
| Photopolymerization initiator OXE-02 | 0.17 mass parts |
| Propyleneglycol monomethylether acetate | 14 mass parts |
| Ethyl-3-ethoxypropionate | 5.0 mass parts |
| Leveling agent | 1.5 mass parts |

(Conditions for Black Matrix Formation)

The transparent substrate 10a made of glass is spin-coated with the above photoresist and the photoresist is dried to produce a coated film of thickness 1.5 µm. The coated film is dried at 100° C. for 3 minutes and then 200 mJ/cm$^2$ is shone by using an exposure photo mask with an opening of 24.5 µm in pattern width (corresponding to the streak width of a black matrix) as a black matrix and an extra-high pressure mercury lamp as a light source.

Next, the photoresist is developed by a 2.5% sodium carbonate solution for 60 seconds and is well washed with water after the development and further dried and then heated at 230° C. for 60 minutes for pattern fixation to form the black matrix 5 on the transparent substrate 10a. The black matrix 5 has a streak width of about 24 µm and is formed in the periphery (four sides) of the rectangular pixel. The angle of gradient of the end of the black matrix streak with the surface of the transparent substrate is set to about 45 degrees.

[Film Formation of the Transparent Conducting Film]

The transparent conducting film 3 (third electrode) made of ITO (metal-oxides film of indium and tin) is formed to a thickness of 0.14 µm like covering the entire surface of the black matrix 5 described above by using a sputtering apparatus.

[Formation of the Linear Resin Layer]

(Synthesis of the Resin A)

686 mass parts of propyleneglycol monomethylether acetate, 332 mass parts of glycidyl methacrylate, and 6.6 mass parts of azobis isobutyro nitrile are added into a separable flask, which is heated at 80° C. for 6 hours in a nitrogen atmosphere to obtain a resin solution.

Next, 168 mass parts of acrylic acid, 0.05 mass parts of methoquinone, and 0.5 mass parts of triphenyl phosphine are added to the obtained resin solution and the solution is heated at 100° C. for 24 hours while blowing an air to obtain an acrylic acid added resin solution.

Further, 186 mass parts of tetrahydrophthalic anhydride is added to the obtained acrylic acid added resin solution and the solution is heated at 70° C. for 10 hours to obtain a resin A solution.

(Preparation of the Photosensitive Resin Solution A)

A negative photosensitive resin solution A is prepared in the following composition:

| | |
|---|---|
| Resin A | 200 mass parts |
| Photopolymerization monomer dipentaerythritol hexaacrylate | 100 mass parts |
| Photopolymerization initiator (manufactured by Ciba Specialty Chemicals K.K., Irgacure 907) | 100 mass parts |
| Solvent (propyleneglycol monomethylether acetate) | 400 mass parts |

A linear resin layer is formed in the center of the rectangular pixel by the publicly known photolithography method using the photosensitive resin solution A and the photo mask as a pattern (opening) of the linear resin layer. The height (thickness) of the linear resin layer is set to 2.5 µm.

[Formation of the Color Pixel]

<<Dispersant for Color Layer Formation>>

The following organic pigments to be dispersed to the color layers are used:

Red pigment: C. I. Pigment Red 254 ("Irga for Red B-CF" manufactured by Ciba Specialty Chemicals K.K.), C. I. Pigment Red 177 ("Cromophtal Red A2B" manufactured by Ciba Specialty Chemicals K.K.)

Green pigment: C. I. Pigment Green 58 (manufactured by DIC Corporation), C. I. Pigment Yellow 150 ("Fanchon First Yellow Y-5688" manufactured by Bayer AG)

Blue pigment: C. I. Pigment Blue 15 ("Ryanol Blue ES" manufactured by Toyo Ink Co. Ltd.), C. I. Pigment Violet 23 ("Variogen Violet 5890" manufactured by BASF AG)

Using the above pigments, a dispersant of each color of red, green, and blue is produced.

<Red Dispersant>

| | |
|---|---|
| Red pigment: C.I. Pigment Red 254 | 18 mass parts |
| Red pigment: C.I. Pigment Red 177 | 2 mass parts |
| Acryl varnish (solid portion: 20% by weight) | 108 mass parts |

After the mixture of the above composition being stirred uniformly, the mixture is dispersed by a sand mill for 5 hours using a glass bead and filter by a 5-µm filter to produce a red pigment dispersed liquid.

<Green Dispersant>

| | |
|---|---|
| Green pigment: C.I. Pigment Green 58 | 16 mass parts |
| Green pigment: C.I. Pigment Yellow 150 | 8 mass parts |
| Acryl varnish (solid portion: 20% by weight) | 102 mass parts |

A green pigment dispersant is produced from the mixture of the above composition by using the same production method as that of the red pigment dispersant.

<Blue Dispersant>

| | |
|---|---|
| Blue pigment: C.I. Pigment Blue 15 | 50 mass parts |
| Blue pigment: C.I. Pigment Violet 23 | 2 mass parts |
| Dispersant ("SOLSPERSE 20000" manufactured by AstroZeneca K.K.) | 6 mass parts |
| Acryl varnish (solid portion: 20% by weight) | 200 mass parts |

A blue pigment dispersant is produced from the mixture of the above composition by using the same production method as that of the red pigment dispersant.

<<Color Pixel Formation>>

A color layer is formed by using a color pixel forming color resist of the composition shown in Table 1 below.

TABLE 1

| Color resist | For red pixel | For green pixel | For blue pixel |
|---|---|---|---|
| Pigment dispersant (parts by weight) | Red dispersant 42.5 | Green dispersant 43.5 | Blue dispersant 35 |
| Acryl resin solution | 6.7 | 5.7 | 14.2 |
| Monomer | 4.0 | 4.8 | 5.6 |
| Photopolymerization initiator | 3.4 | 2.8 | 2.0 |
| Sensitizer | 0.4 | 0.2 | 0.2 |
| Organic solvent | 43.0 | 43.0 | 43.0 |
| Total | 100 | 100 | 100 |

To form a color layer, first the glass substrate 10a shown in FIG. 9 on which the black matrix 5 and the transparent conducting film 3 are formed is coated with a color resist for red pixel formation by spin-coating in such a way that a finished thickness becomes 2.5 µm. After being dried at 90° C. for 5 minutes, the color resist is irradiated with light from a high pressure mercury lamp through a photo mask for color pixel formation at a dose rate of 300 mJ/cm$^2$ and developed by an alkali developer for 60 seconds to form the red color pixel 15 in a stripe shape on a rectangular pixel like covering the linear resin layer 4. Then, the red color pixel 15 is baked at 230° C. for 30 minutes. The overlapping portion of the black matrix 5 and the color layer is adjusted to 6 µm.

Next, the glass substrate 10a is similarly coated with a color resist for green pixel formation in such a way that a finished thickness becomes 2.5 μm and the linear resin layer 4 is covered. After being dried at 90° C. for 5 minutes, the green pixel 14 is formed by exposure through a photo mask and development so that a pattern is formed in a position adjacent to the red pixel 15 via the recess 13. Incidentally, the known photolithography technology is used for the manufacture of the color filter substrate including the present example and, for example, the color filter substrate shown in FIG. 9 is manufactured on a film surface (color filter surface) in the manufacturing process thereof.

Further, like red and green, the blue pixel 16 adjacent to the red pixel and green pixel and whose finished thickness is 2.5 μm is obtained from a color resist for blue pixel formation. In this manner, a color filter having color pixels of three colors red, green, and blue on the substrate 10a is obtained. Then, the color filter is hardened by heat treatment at 230° C. for 30 minutes.

[Formation of the Protective Layer]
(Synthesis of the Resin B)
800 mass parts of cyclohexanone are put into a reaction vessel and the vessel is heated while a nitrogen gas being pumped into the vessel and a mixture of the following monomers and thermal polymerization initiator is dropped to cause a polymerization reaction.

| | |
|---|---|
| Styrene | 60 mass parts |
| Methacrylic acid | 60 mass parts |
| Methyl methacrylate | 65 mass parts |
| Butyl methacrylate | 65 mass parts |
| Thermal polymerization initiator | 10 mass parts |
| Chain transfer agent | 3 mass parts |

After the mixture being sufficiently heated, 2.0 mass parts of the thermal polymerization initiator dissolved in 50 mass parts of cyclohexanone are added and further the reaction is continued to obtain a solution of acryl resin. Cyclohexanone is added to the resin solution so that the solid portion becomes 20% by weight to prepare an acryl resin solution as the resin B.

The weight average molecular weight of the acryl resin is about 10,000.

(Resin Coating Liquid B)
After a mixture of the composition shown below being stirred and mixed uniformly, the mixture is dispersed by a sand mill for 5 hours using a glass bead of 1 mm in diameter and then filtered by a 5 μm filter to obtain a resin coating liquid B.

| | |
|---|---|
| Resin B | 150 mass parts |
| Polyfunctional polymerization monomer ("Aronix M-400" manufactured by Toagosei Co. Ltd.) | 20 mass parts |
| Photopolymerization initiator ("Irgacure 907" manufactured by Ciba Specialty Chemicals K.K.) | 16 mass parts |
| Cyclohexanone | 500 mass parts |

The protective layer 18 of the thickness 0.3 μm is formed by using the resin coating liquid B like covering the entire surface of the black matrix and color layers to complete the color filter substrate.

The linear recess 13 in a plane view without color layer is formed in the center portion of the black matrix 5 in the line width direction. The depth D of the recess 13 sandwiched between color layers of different colors is set to about 1 μm.

The height H of the projection 24 as a superimposed portion of the linear resin layer 4, the color layer, and the protective layer 18 becomes about 1.1 μm. The inclination of the projection 24 is about 45 degrees as an angle with the surface of the transparent substrate. The height H of the projection 24 is defined as a height from the pixel surface of the green pixel 14 to the top of the superimposed portion.

EXAMPLE 2

The color filter substrate shown in FIG. 10 is produced as described below.

The black matrix 5 whose finished thickness is 1.5 μm is formed by using the following black composition on the transparent substrate 10a of glass on which the transparent conducting film 3 of the thickness 0.15 μm is already formed.

(Preparation of the Black Composition)
(Pigment Dispersing Element RD1)
A pigment dispersing element (RD1) is prepared by processing 20 mass parts of a mixture of C. I. Pigment Red 254/C. I. Pigment Red 177=80/20 (weight ratio) as a coloring agent, 5 mass parts (solid portion converted) of BYK-2001 as a dispersant, and 75 mass parts of propyleneglycol monomethylether acetate as a solvent by a sand mill.

(Pigment Dispersing Element YD1)
A pigment dispersing element (YD1) is prepared by processing 20 mass parts of C. I. Pigment Yellow 150 as a coloring agent, 5 mass parts (solid portion converted) of SOLSPERSE 24000 as a dispersant, and 75 mass parts of propyleneglycol monomethylether acetate as a solvent by a sand mill.

(Pigment Dispersing Element BD1)
A pigment dispersing element (BD1) is prepared by processing 20 mass parts of C. I. Pigment Blue 15:6 as a coloring agent, 5 mass parts (solid portion converted) of AJISPER PB-821 as a dispersant, and 75 mass parts of propyleneglycol monomethylether acetate as a solvent by a sand mill.

(Pigment Dispersing Element VD1)
A pigment dispersing element (VD1) is prepared by processing 20 mass parts of C. I. Pigment Violet 23 as a coloring agent, 5 mass parts (solid portion converted) of AJISPER PB-821 as a dispersant, and 75 mass parts of propyleneglycol monomethylether acetate as a solvent by a sand mill.

(Synthesis of the Resin Solution (P1))
800 mass parts of cyclohexanone are put into a reaction vessel and the vessel is heated while a nitrogen gas being pumped into the vessel and a mixture of the following monomers and thermal polymerization initiator is dropped to cause a polymerization reaction.

| | |
|---|---|
| Styrene | 60 mass parts |
| Methacrylic acid | 60 mass parts |
| Methyl methacrylate | 65 mass parts |
| Butyl methacrylate | 65 mass parts |
| Thermal polymerization initiator | 10 mass parts |
| Chain transfer agent | 3 mass parts |

After the mixture being sufficiently heated, 2.0 mass parts of the thermal polymerization initiator dissolved in 50 mass parts of cyclohexanone are added and further the reaction is continued to obtain a solution of acryl resin. Cyclohexanone is added to the resin solution so that the non-volatile portion becomes 20% by weight to prepare an acryl resin solution as the resin solution (P1). The weight average molecular weight of the acryl resin is about 10,000.

(Black Composition)

After a mixture of the composition shown below being stirred and mixed uniformly, the mixture is filtered by a 5-μm filter to obtain a black composition. The black composition is used to form a light-shielding layer and a base in a subsequent example.

| | |
|---|---|
| Pigment dispersing element (RD1) | 21 mass parts |
| Pigment dispersing element (BD1) | 17 mass parts |
| Pigment dispersing element (YD1) | 4 mass parts |
| Resin solution (P-1) | 9 mass parts |
| Trimethylolpropane triacrylate | 4.8 mass parts |
| Photopolymerization initiator ("Irgacure-369" manufactured by Ciba Specialty Chemicals K.K.) | 2.8 mass parts |
| Photosensitizer ("EAB-F" manufactured by Hodogaya Chemical Co. Ltd.) | 0.2 mass parts |
| Cyclohexanone | 36.2 mass parts |

The black composition obtained as described above has about 1.8 as the optical density (OD value) per 1 μm of thickness hardened after coating formation. The thickness can be adjusted by coating conditions. The optical density of the coated film can also be adjusted by adjusting the ratio of components of the solid ratio of the resin (resin solution). The light-shielding effect of the green organic pigment is low and so is not added to the black composition.

The produced color filter substrate will be described with reference to FIG. 10. The red pixel 15, the green pixel 14, and the blue pixel 16 all have the thickness 2.5 μm. The same color resist as that used in Example 1 is used.

Further, the same resin coating liquid B as that used in Example 1 is used to form the protective film 18 of the thickness 0.3 μm to complete the color filter substrate.

EXAMPLE 3

As shown in FIG. 1, the color filter substrate 11 according to Example 1 and the array substrate 21 on which active elements TFT are formed are sealed, the liquid crystal 17 of negative dielectric constant anisotropy is enclosed and further, a polarizing plate is pasted to both sides to create a liquid crystal display device. A vertically aligned film is already formed on the surface of the color filter substrate and the array substrate by coating. The array substrate 21 having comb-like electrodes shown in FIGS. 6 and 7 is used as a substrate on which active elements are formed.

The illustration of an alignment film for vertical alignment is omitted. Vertical alignment of approximately 90° is adopted without performing strict alignment processing (for example, alignment processing in a plurality of directions to form a plurality of domains by setting the tilt angle to 89°) needed for a liquid crystal display device of vertical alignment such as MVA and VATN.

The produced liquid crystal display device will be described with reference to FIG. 1. The operation of the liquid crystal 17 will be described by being represented by the green pixel 14 in the center in FIG. 1.

Liquid crystal molecules of the liquid crystal 17 whose initial alignment is the vertical alignment incline in the direction moving the color pixel 14 from the rectangular pixel center toward the linear resin layer 4, that is, in the direction indicated by an arrow A due to the first electrode 1 and the second electrode 2 when a drive voltage is applied. The second electrode 2 is shifted from the first electrode 1 in the direction indicated by the arrow A. The third electrode 3 and the second electrode 2 are assumed to be at the same potential.

EXAMPLE 4

A liquid crystal display device according to the present example is shown in FIG. 11. While the same materials and the same manufacturing process as in Example 1 are used, a color filter 31 used in the present example has a thin superimposed portion of color layers on the black matrix 5 formed by using a gray-tone mask (photo mask having a pattern whose transmittance is lowered so that the color layer in the superimposed portion becomes thin) as shown by a broken line circle 42. By forming the superimposed portion of color layers on the black matrix 5 thin, an applied voltage between the third electrode 3 by the transparent conducting film disposed on the black matrix 5 and the first electrode on the side of an array substrate 41 is more likely to be applied to a liquid crystal 47. The array substrate 41 is configured in the same manner as the array substrate in Example 3 except that a common electrode 2c is provided in a position (below) corresponding to the black matrix 5. No protective film is formed on the color filter substrate in the present example.

The liquid crystal display device shown in FIG. 11 is produced by sandwiching the color filter 31 and the array substrate 41 on which a vertically aligned film is formed, enclosing the liquid crystal 47 of negative dielectric constant anisotropy therebetween and further, pasting a polarizing plate on both sides. The illustration of an alignment film for vertical alignment is omitted. Vertical alignment of approximately 90° is adopted without performing strict alignment processing (for example, alignment processing in a plurality of directions to form a plurality of domains by setting the tilt angle to 89°) needed for a liquid crystal display device of vertical alignment such as MVA and VATN.

The produced liquid crystal display device will be described with reference to FIG. 11.

On the side of the color filter substrate 31, liquid crystal molecules 47a, 47b positioned in the shoulders of the color layer of the liquid crystals 47 whose initial alignment is the vertical alignment incline in an arrow B direction immediately after the voltage to drive the liquid crystal is applied to become a trigger of nearby liquid crystal molecules.

Liquid crystal molecules 47c, 47d near the protruding portions of the second electrode of the liquid crystals 47 whose initial alignment is the vertical alignment on the side of the array substrate 41 incline in the direction of the arrow B immediately after the application of voltage to become, like the above case, a trigger of liquid crystal molecules near the liquid crystal molecules 47c, 47d. Liquid crystal molecules incline in the direction moving the green pixel 14 as a color pixel toward the linear resin layer 4 of the rectangular pixel center, that is, in the direction indicated by the arrow B due to the first electrode 1 and the second electrode 2. The second electrode 2 is shifted from the first electrode 4. The common electrode 2c, the second electrode 2, and the third electrode 3 are assumed to be at a common potential (the common or ground) of the same potential. The purpose of providing the common electrode 2c is to reduce a crosstalk to adjacent pixels.

By applying a voltage higher than the drive voltage, liquid crystal molecules in the dynamic display area incline so that a bright transmission display is obtained. The linear resin layer 4 in the center in the present example increases the transmittance of light and so a brighter display can be obtained and a liquid crystal display full of liveliness can be provided.

The illustration of the alignment film, TFT element, polarizing plate, and phase difference plate is omitted.

EXAMPLE 5

Example 5 will be described by using FIG. 12.

The dispersant for black matrix formation, dispersant for coloring formation, and photosensitive resin solution for linear resin layer formation used in the present example are all the same materials as in Example 1. The present example is different in that in the formation of a color pixel after the third electrode 3 as a transparent conducting film being formed on the black matrix 5, a color layer in a portion corresponding to the dynamic display area is formed thin to a thickness of 1.2 μm by using a gray-tone mask to create a color layer having a recess 54. The linear resin layer 4 of the thickness 2.5 μm is formed by using the same photosensitive resin solution as in Example 1 and further, the protective layer 18 is formed to a thickness of 0.3 μm to complete a color filter substrate 51. The array substrate 41 is the same as in Example 4.

A liquid crystal 57 uses a liquid crystal of negative dielectric constant anisotropy and has the vertical alignment as the initial alignment. The illustration of the alignment film, TFT element, polarizing plate, and phase difference plate is omitted.

EXAMPLE 6

Example 6 will be described by using FIG. 13.

The dispersant for black matrix formation and dispersant for coloring formation used in the present example are the same materials as in Example 1. After the black matrix 5 being formed on the transparent substrate 10a, a color pixel is formed. In this case, like in Example 5, a color layer corresponding to the dynamic display area is formed thin to a thickness of 1.2 μm by using a gray-tone mask to create color layers 14, 15, 16 having the recess 54. Each of the color layers 14, 15, 16 is laid on top of the other on the black matrix 5. The thickness of the color layers 14, 15, 16 is set to 2 μm.

A color resist having the composition shown in Table 2 below is used to form a color pixel.

TABLE 2

| Color resist | For red pixel | For green pixel | For blue pixel |
| --- | --- | --- | --- |
| Pigment dispersant (parts by weight) | Red dispersant 51 | Green dispersant 52 | Blue dispersant 42 |
| Acryl resin solution | 1 | 0 | 10 |
| Monomer | 4 | 4.8 | 5.6 |
| Photopolymerization initiator | 3.4 | 2.8 | 2 |
| Sensitizer | 0.4 | 0.2 | 0.2 |
| Organic solvent | 40.2 | 40.2 | 40.2 |
| Total | 100 | 100 | 100 |

Next, after a first resin layer 55 being formed by coating of the resin A used for the formation of the linear resin layer in Example 1 to a thickness of 2 μm, a portion of the first resin layer 55 above the black matrix 5 is removed by exposure and development to form a recess 56.

Next, after a second resin layer being formed by coating of the resin B used for the formation of the protective layer in Example 1 to a thickness of 0.6 μm, a projection 58 formed from the second resin layer is formed above the recess 54 of the color layer 14 to form a color filter substrate.

EXAMPLE 7

Figure 14:
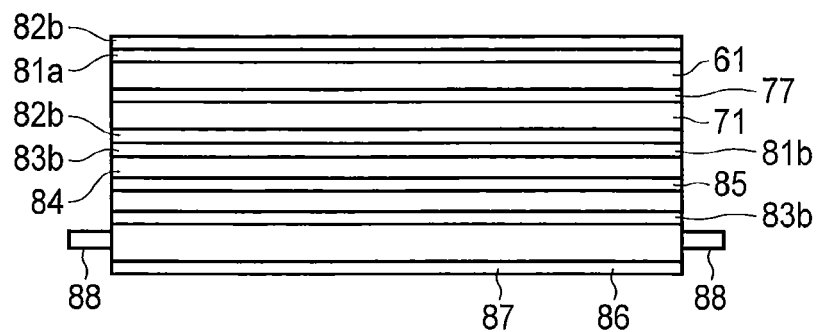
FIG. 14 is a sectional view showing a liquid crystal display device according to Example 7.

A liquid crystal display device according to the present example is shown in FIG. 14. The present example is a transflective liquid crystal display device using a reflection polarizing plate. For example, a reflective polarizing plate described in Japanese Patent No. 4177398 can be used as the reflective polarizing plate.

A color filter substrate 61 used in the present example is, for example, the color filter substrate in Example 1 shown in FIG. 9. An array substrate 71 on which active elements (TFT) are formed is, for example, the array substrate having comb-like electrodes shown in example 5.

The color filter substrate 61 and the array substrate 71 are arranged opposite to each other and sandwiched a liquid crystal 77 being interposed therebetween. An optical compensation layer 81a and a polarizing plate 82a are arranged on the side opposite to the liquid crystal 77 of the color filter substrate 61. Also, a polarizing plate 82b, an optical diffusion layer 83a, a reflective polarizing plate 84, an optical compensation layer 81b, a prism sheet 85, an optical diffusion layer 83b, a light guide plate 86, and a light reflection plate 87 are sequentially disposed on the side opposite to the liquid crystal 77 of the array substrate 71. A light source, for example, an LED light source 88 is mounted on the light guide plate 86.

An individual RGB light-emitting device is desirable as the LED light source 88, but a quasi-white LED may be adopted. Instead of the LED, a cold cathode ray tube or fluorescent lamp conventionally used widely may be used. If an individual RGB light-emitting device is used as the LED light source 88, luminescence intensity of each color can be adjusted individually and thus, the optimal color display can be made. Application thereof to a stereoscopic image display can also be considered.

According to a liquid crystal display device according to the embodiments described above, alignment processing of a color filter substrate or array substrate can be reduced and also responsiveness of liquid crystals can be improved. Also with a configuration of providing a projection, recess, first electrode (pixel electrode), and second electrode, the disclination of the liquid crystal layer is reduced so that the liquid crystal display can be improved.

Moreover, a configuration in which the transparent conducting film is laminated so as to cover effective display pixels of a color filter can be adopted and thus, in contrast to the IPS (the liquid crystal is driven by a transverse electric field) system and FFS (the liquid crystal is driven by an electric field generated in a fringe of a comb-like electrode) system, a liquid crystal display device resistant to an external electric field can be provided.

A rectangular pixel of a liquid crystal display device according to the present embodiment can be divided into ½ pixels or ¼ pixels that are symmetric (line symmetric or point symmetric) with respect to the linear resin layer through the pixel center and viewing angle adjustments and the stereoscopic image display can be realized by adopting a driving system in which two or four TFT elements are formed in each pixel and a different voltage is applied to each TFT element.

Alternatively, two TFTs may be formed in each pixel, one of which driving the liquid crystals of the reflective portion and the other driving the liquid crystals of the transmissive portion. Depending on the size or use of the liquid crystal display device, the number, density, interval, and arrangement in the pixel opening width directions of first and second electrodes as comb-like patterns can be adjusted appropriately.

What is claimed is:

1. A color filter substrate for a liquid crystal display device, comprising:
- a transparent substrate;
- a black matrix formed on the transparent substrate and having an opening for division into a plurality of pixels;
- a transparent conducting film coated over the black matrix and coated over the transparent substrate; and
- a color layer formed on a pixel of the plurality of pixels, wherein
- a linear projection is formed in a center of the pixel, the linear projection being a laminated constitution of
  - a linear resin layer formed in the center of the pixel, and the color layer,
- the laminated constitution of the linear resin layer and the color layer is laminated in an order of the linear resin layer and the color layer, and
- a recess is formed above the black matrix and is formed by a step between the adjacent color layers.

2. The color filter substrate for a liquid crystal display device according to claim 1, wherein the color layer includes three color layers formed of a red pixel, a green pixel, and a blue pixel formed on the respective pixels.

3. A liquid crystal display device, comprising: the color filter substrate for a liquid crystal display device according to claim 1.

4. The liquid crystal display device according to claim 3, wherein the liquid crystal display device comprises the color filter substrate for the liquid crystal display device, an array substrate on which drive elements for liquid crystals are disposed in a matrix arrangement, and a liquid crystal layer interposed between the color filter substrate and the array substrate, and the array substrate includes first and second electrodes to which different potentials are applied to drive the liquid crystals, and the liquid crystals has negative dielectric constant anisotropy.

5. The liquid crystal display device according to claim 4, wherein when a drive voltage is applied between the first electrode, and the second electrode and a third electrode, molecules of the liquid crystals in a pixel region of the liquid crystal display device tilt to opposite directions symmetrically with respect to a straight line dividing the pixel region into two parts.

6. The liquid crystal display device according to claim 4, wherein the first electrode and the second electrode are formed of a conductive metal-oxides that is transparent in a visible range.

* * * * *